United States Patent
Xi et al.

(10) Patent No.: US 10,924,229 B2
(45) Date of Patent: Feb. 16, 2021

(54) MULTIPLE DIMENSION MODULATION IN 5G SYSTEMS

(71) Applicant: IDAC Holdings, Inc., Wilmington, DE (US)

(72) Inventors: Fengjun Xi, San Diego, CA (US); Steven Ferrante, Doylestown, PA (US); Kyle Jung-Lin Pan, Saint James, NY (US); Alphan Sahin, Westbury, NY (US); Chunxuan Ye, San Diego, CA (US); Robert L. Olesen, Huntington, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 72 days.

(21) Appl. No.: 16/088,075

(22) PCT Filed: Mar. 29, 2017

(86) PCT No.: PCT/US2017/024848
§ 371 (c)(1),
(2) Date: Sep. 25, 2018

(87) PCT Pub. No.: WO2017/172985
PCT Pub. Date: Oct. 5, 2017

(65) Prior Publication Data
US 2020/0259607 A1    Aug. 13, 2020

Related U.S. Application Data

(60) Provisional application No. 62/315,604, filed on Mar. 30, 2016, provisional application No. 62/373,195, filed on Aug. 10, 2016.

(51) Int. Cl.
*H04L 5/00* (2006.01)
*H04B 7/0456* (2017.01)
(Continued)

(52) U.S. Cl.
CPC ......... *H04L 5/0026* (2013.01); *H04B 7/0473* (2013.01); *H04B 7/10* (2013.01); *H04L 1/0005* (2013.01); *H04L 5/0023* (2013.01)

(58) Field of Classification Search
CPC ... H04L 5/0026; H04L 1/0005; H04L 5/0023; H04B 7/0473; H04B 7/10
See application file for complete search history.

(56) References Cited

U.S. PATENT DOCUMENTS

| 7,668,075 B2 | 2/2010 | Hosur |
| 2007/0211786 A1* | 9/2007 | Shattil ............... H04J 13/00 375/141 |

(Continued)

FOREIGN PATENT DOCUMENTS

| WO | 2008045001 | 4/2009 |
| WO | 2015113603 | 8/2015 |

OTHER PUBLICATIONS

Christodoulou, C. G., et. al., "Reconfigurable Antennas for Wireless and Space Applications". Proceedings of the IEEE, vol. 100, No. 7, (2012), pp. 2250-2261.

(Continued)

*Primary Examiner* — Wutchung Chu
(74) *Attorney, Agent, or Firm* — Invention Mine LLC

(57) ABSTRACT

Systems and methods related to increased spectrum efficiency for 5G communications, comprising combining time, frequency, spatial, and signal domains for multi-dimension modulation. In one embodiment, the ability of reconfigurable antenna to change their radiation pattern and/or polarization modes may be used to modulate additional information onto the conventional SM-MIMO transmitted signal. In further embodiments, various combinations of space shift keying, block coding, multi-carrier modulation, and the like (Continued)

may be used to introduce additional dimensions for data modulation and achieve diversity gain.

20 Claims, 17 Drawing Sheets

(51) Int. Cl.
*H04B 7/10* (2017.01)
*H04L 1/00* (2006.01)

(56) References Cited

U.S. PATENT DOCUMENTS

| | | | |
|---|---|---|---|
| 2008/0170533 A1* | 7/2008 | Cyzs | H04B 7/04 370/315 |
| 2009/0110033 A1* | 4/2009 | Shattil | H04J 14/0298 375/141 |
| 2011/0274429 A1 | 11/2011 | Caplan | |
| 2013/0287133 A1 | 10/2013 | Coon | |
| 2014/0206291 A1* | 7/2014 | Ichikawa | H04L 27/0008 455/63.1 |
| 2014/0247748 A1 | 9/2014 | Kang | |
| 2015/0207551 A1 | 7/2015 | Kang | |
| 2015/0214633 A1* | 7/2015 | Pan | H04B 7/0413 342/372 |
| 2016/0134024 A1* | 5/2016 | Noh | H01Q 21/061 375/295 |
| 2016/0134408 A1 | 5/2016 | Kim | |
| 2016/0337012 A1* | 11/2016 | Kimura | H04B 7/0404 |
| 2017/0033847 A1* | 2/2017 | Lomayev | H04B 7/10 |
| 2017/0054482 A1* | 2/2017 | Forenza | H04B 7/0626 |
| 2017/0054583 A1 | 2/2017 | Pratt | |
| 2017/0070280 A1* | 3/2017 | Henarejos Hernandez | H04W 72/087 |
| 2017/0212210 A1 | 7/2017 | Chen | |
| 2018/0241476 A1* | 8/2018 | Johnson | H04B 10/671 |

OTHER PUBLICATIONS

Wengerter, C., "Advanced Hybrid ARQ Technique Employing a Signal Constellation Rearrangement". Proceedings IEEE 56th Vehicular Technology Conference, vol. 4, (2002), pp. 2002-2006.

Invitation to Pay additional fees and, where applicable, protest fee for PCT/US2017/024848 dated Jul. 5, 2017, 15 pages.

R Ramirez-Gutierrez et al: "Antenna pattern shift keying modulation for MIMO channels", Aug. 20, 2013 (Aug. 20, 2013), XP055384568, Wireless Conference (EW), Proceedings of the 2013 19th European Retrieved from URL: http://ieeexplore.ieee.org/ielx7/6582749/6582750/06582818.pdf?tp=&arnumber=6582818&isnumber=6582750, [retrieved on Jun. 23, 2017].

International Search Report and the Written Opinion of the International Searching Authority for PCT/US2017/024848 dated Aug. 29, 2017, 19 pages.

International Preliminary Report on Patentability for PCT/US2017/024848 dated Oct. 11, 2018.

ITU, "IMT Vision—Framework and Overall Objectives of the Future Development of IMT for 2020 and Beyond". International Telecommunication Union, ITU-R Recommendation M.2083, M Series, Sep. 2015, 21 pages.

NGMN Alliance, "5G White Paper". Next Generation Mobile Networks (NGMN), Version 1.0, Feb. 2015, 125 pages.

Samsung, "Vision and Schedule for 5G Radio Technologies". 3GPP RAN Workshop on 5G Presentation, RWS-150039, Sep. 2015, 19 pages.

International Search Report and the Written Opinion of the International Searching Authority for PCT/US2017/024845 dated Jun. 2, 2017, 15 pages.

Internatioanl Preliminary Report on Patentability for PCT/US2017/024845 completed on Mar. 27, 2018.

Park, Jangyong, et. al., "An Enhanced Dual Carrier Modulation for Performance Improvement in WiMedia UWB Systems". IEEE Transactions on Consumer Electronics, vol. 57, No. 4, Nov. 2011, pp. 1556-1563.

* cited by examiner

Reconfigurable Alford Loop

Pattern and Polarization Reconfigurable Circular Patch

Reconfigurable Dipole

MULTIPLE DIMENSION MODULATION IN 5G SYSTEMS

CROSS-REFERENCE TO RELATED APPLICATIONS

The present application is a national stage application under 35 U.S.C. 371 of International Application No. PCT/US2017/024848, entitled MULTIPLE DIMENSION MODULATION IN 5G SYSTEMS, filed on Mar. 29, 2017, which claims benefit under 35 U.S.C. § 119(e) from, U.S. Provisional Patent Application Serial No. 62/315,604, filed Mar. 30, 2016, entitled "MULTIPLE DIMENSION MODULATION IN 5G SYSTEMS", and U.S. Provisional Patent Application Serial No. 62/373,195, filed Aug. 10, 2016, entitled "MULTIPLE DIMENSION MODULATION IN 5G SYSTEMS", each of which is incorporated herein by reference in its entirety.

TECHNICAL FIELD

This disclosure relates to systems and methods for beamforming training in wireless communications, such as 5G New Radio or wireless local area networks (WLANs), such as Institute of Electrical and Electronics Engineers (IEEE) 802.11ay WLANs.

BACKGROUND

The throughput of wireless communication systems has been increased significantly by new technologies introduced in LTE and Wi-Fi. These technologies, however, are not sufficient to meet the demands of future applications which may require Gbits/sec of throughput and latencies of 1 ms. Therefore, research on a new radio access technology, known as the 5G, has already started. As the applications and ubiquity of cellular communication systems grow, they are expected to support new features, and meet a more stringent set of performance requirements. Based on the general requirements set out by ITU-R (in ITU-R Recommendation M.2083, "IMT vision—framework and overall objectives of the future development of IMT for 2020 and beyond," 2015), NGMN (in NGMN Alliance, "5G white paper," 2015) and 3GPP, a broad classification of the use cases for emerging 5G systems can be depicted as follows: Enhanced Mobile Broadband (eMBB), Massive Machine Type Communications (mMTC) and Ultra Reliable and Low Latency Communications (URLLC). Different use cases may focus on different requirements such as higher data rate, higher spectrum efficiency, low power and higher energy efficiency, lower latency and higher reliability.

Massive machine type communication (mMTC) is one of the three main use case categories for the fifth-generation cellular standards (5G). The mMTC use case is characterized by the desire to provide connectivity for a very large number of low cost devices. Target applications include things such as smart metering, home appliances, and remote sensors. Common to all of these applications is that the data transmissions are relatively small and infrequent. One of the key requirements to make these massive deployments feasible may be the ability to use low cost devices with significantly extended battery life.

Spatial modulation MIMO (SM-MIMO) is a modulation technique that modulates information onto the antenna indices at the transmitter allowing the number of radio frequency (RF) chains to be less than the number of transmit antennas, thus reducing overall cost and power consumption compared to conventional MIMO. Therefore, SM-MIMO primarily targets energy efficiency (EE) without sacrificing spectrum efficiency (SE).

Link adaptation is a widely used technique whereby certain transmit parameters are dynamically configured, based on channel conditions, in order to optimize certain link criteria. Adaptive modulation and coding (AMC) is one common link adaptation scheme that adjusts the modulation and coding scheme based on the current channel conditions and a desired error probability so that the spectral efficiency (SE) is maximized. Multiple input multiple output (MIMO) technology also primarily targets higher SE. Spatial multiplexing (SMX) is a MIMO technique which allows for multiple simultaneous data streams to be transmitted and received over the same radio channel. For this technique to be successful certain channel conditions need to satisfied, hence link adaptation can also be applied by dynamically adjusting the SMX mode based on the current channel conditions so as to maximize the SE.

Overall, SM-MIMO is a powerful communication technique that primarily targets low cost devices and energy efficient operation. Furthermore, link adaptation is a similarly powerful technique that is used to increase SE based on the changing channel conditions these systems will inevitable encounter.

Electrically reconfigurable antennas are capable of dynamically reshaping themselves and thereby changing their radiation characteristics. This dynamic reshaping can be realized by integrating PIN/varactor diodes and/or MEMS devices into the structure of the antenna, and further electrically controlling these components. Sample reconfigurable antennas are shown in FIG. 2.

Generally, reconfigurable antennas can be classified into four different categories (for example, as discussed in C. G. Christodoulou, Y. Tawk, S. A. Lane, and S. R. Erwin, "Reconfigurable antennas for wireless and space applications," Proceedings of the IEEE, vol. 100, no. 7, pp. 2250-2261, 2012.).

1. A radiating structure that is able to change its operating or notch frequency by hoping between different frequency bands is called frequency reconfigurable antenna. This is achieved by producing some tuning or notch in the antenna reflection coefficient.
2. A radiating structure that is able to tune its radiation pattern is called radiation pattern reconfigurable antenna. For this category, the antenna radiation pattern changes in terms of shape, direction, or gain.
3. A radiating structure that can change its polarization (horizontal/vertical, _slant 45_, left-hand or right-hand circular polarized, etc.) is called polarization reconfigurable antenna. In this case, the antenna can change, for example, from vertical to left-hand circular polarization, or any other arbitrary polarization.
4. This category is a combination of the previous three categories. For example, one can achieve a frequency reconfigurable antenna with polarization diversity at the same time.

SUMMARY

Maximizing spectral efficiency (SE) has historically been the main driver for technology development, while little attention has been paid to energy efficiency (EE). While conventional MIMO technology is recently responsible for some of the substantial increases in SE, it does so at the cost of increased circuit power dissipation at the transmitter as well as increased signal processing complexity at the receiver. SM-MIMO, which under some channel conditions may exhibit smaller increases in SE as compared to conventional MIMO, can provide substantial gains in EE. Therefore, further developing SM-MIMO will lead to improved methods to strike a better balance between SE and EE than conventional MIMO techniques currently offer.

One of the key requirements to make mMTC deployments feasible will be the ability to use low cost devices with significantly extended battery life. Keep in mind however, even though most current mMTC applications require a relatively low data rate, newer applications, which will undoubtedly emerge in the future, may have increased data rate requirements. Nevertheless, because of the large number of devices deployed for all of these applications, low cost devices with extended battery life will continue to be a key requirement. Designing systems using low cost devices that can further strike the proper balance between EE and SE in an operational mode will be critical for the successful deployment of the mMTC use case for 5G.

Note that 5G may be interchangeably used with New Radio or New Radio Access or New Radio interface in the invention.

The mMTC use case relies on the ability to design systems that strike the proper balance between the required SE while also enabling an extremely energy efficient design. The SM-MIMO concept may be leveraged for its low cost device architectures and energy efficient operation, while additional antenna based modulation and link adaptation techniques may be utilized to assure the maximum SE is being extracted from the channel. Especially with the requirements for higher frequency and wider bandwidth operation, it is desired to optimize the system design to improve the balance of SE and EE. Specifically, the following scenarios are addressed by systems and methods disclosed herein.

Multi-Dimension modulation for high spectrum efficiency. In order to increase spectral efficiency for 5G and beyond or New Radio or New Radio Access or New radio interface communications such as for the eMBB use case, it is desired to exploit all possible degrees (or dimensions) of freedom to transmit more information bits per channel use. Specifically, embodiments described herein describe methods and procedures for combining the time, frequency, spatial, and signal domains for multi-dimension modulation.

In addition, embodiments herein describe methods and procedures for enhanced spatial modulation. For example, methods and procedures which leverage antenna and other dimensions of modulation for signal transmission may be required. Optimization for the highest possible SE within a given EE constraint for low power applications such as mMTC.

Two-Dimensional scaled pair modulation. URLLC was defined as an important use case for 5G systems. In order to achieve high reliability under tight latency constraints, a new challenge on the modulation scheme design rises. In general, the wireless communication channel suffers from many impairments including noise, interference, and multipath fading. In the case of URLLC, the goal is to provide a much more robust transmission for a much smaller payload despite these inherent impairments.

One performance target for URLLC is the support of high mobility speeds up to 500 km/h. An ultra-reliable channel estimate at these high Doppler environments is difficult to obtain, and such an accurate channel estimation in high Doppler scenarios requires a lot of overhead. One approach described herein to solve this problem is to use a non-coherent modulation scheme. Compared to the traditional differential modulation such as DBPSK or DQPSK, which is essentially phase shift modulation and sensitive to phase due to phase noise. The M-ary modulation is widely used in many communication system, and it might continue to be used for future communication systems, e.g., 5G New Radio. Hence, some embodiments apply the differential M-ary modulation. The embodiments described herein apply differential M-ary modulation so as to identify the phase difference between two M-ary symbols.

Ultra-High Reliability Low Latency (URLL) Modulation. Some embodiments disclosed herein describe methods and procedures which drive the reliability of transmissions to an order of magnitude higher than currently available. Methods such as HARQ, and enhanced channel coding, may achieve ultra-high reliability but at the cost of higher latency. In some embodiments, methods which enable high reliability without sacrificing latency are disclosed. These methods can achieve diversity gain to improve system performance and spectral efficiency. They also can mitigate the interference in case of co-channel coexistence of eMBB and URLLC.

BRIEF DESCRIPTION OF THE DRAWINGS

A more detailed understanding may be had from the following description, presented by way of example in conjunction with the accompanying drawings, wherein.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Network Architecture.

Figure 1A:
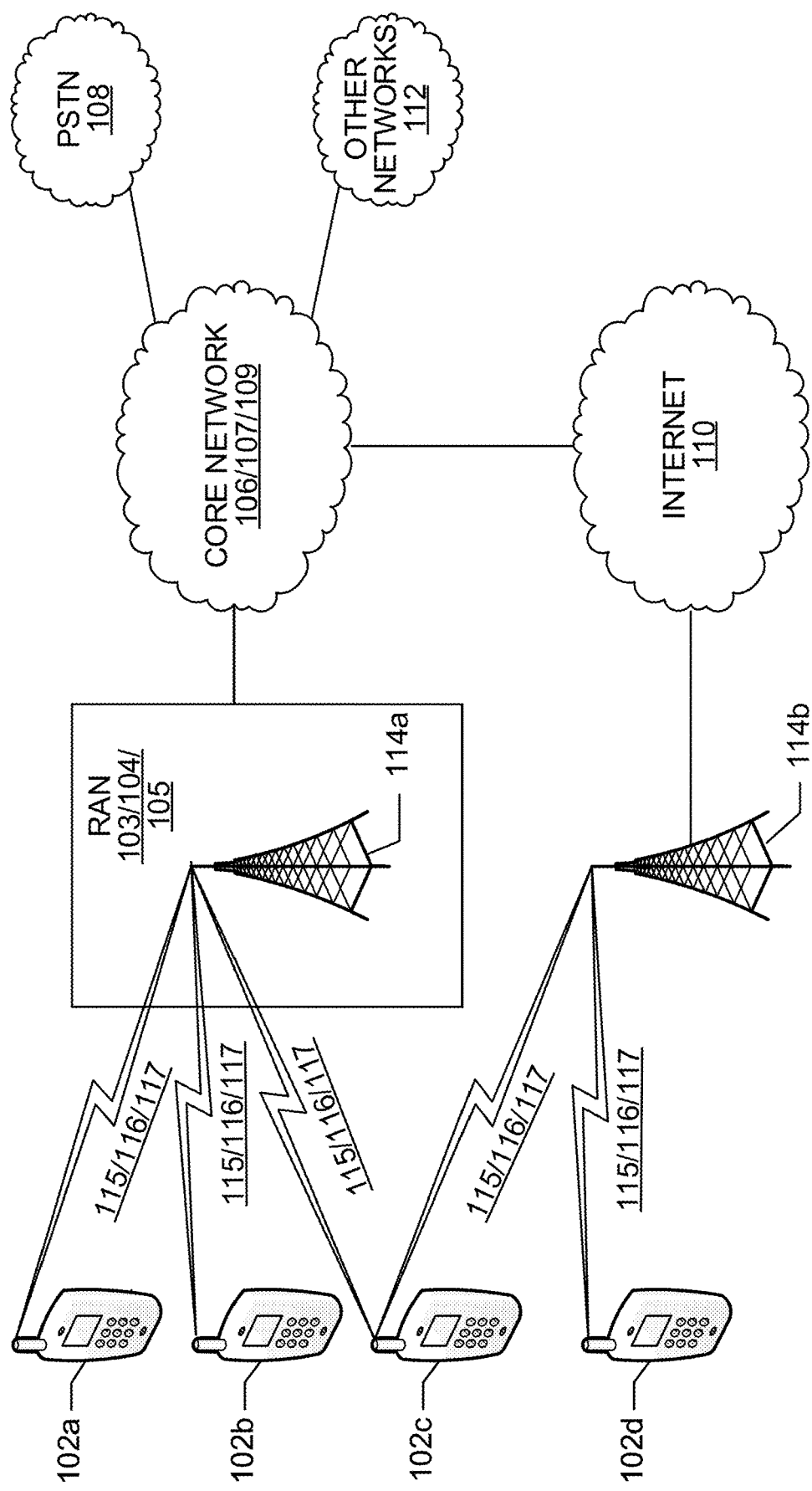
FIG. 1A depicts an example communications system in which one or more disclosed embodiments may be implemented.

The systems and methods disclosed herein may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E UTRA), which may establish the air interface 115/116/117 using Long Term Evolution (LTE) and/or LTE Advanced (LTE A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS 2000), Interim Standard 95 (IS 95), Interim Standard 856 (IS 856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
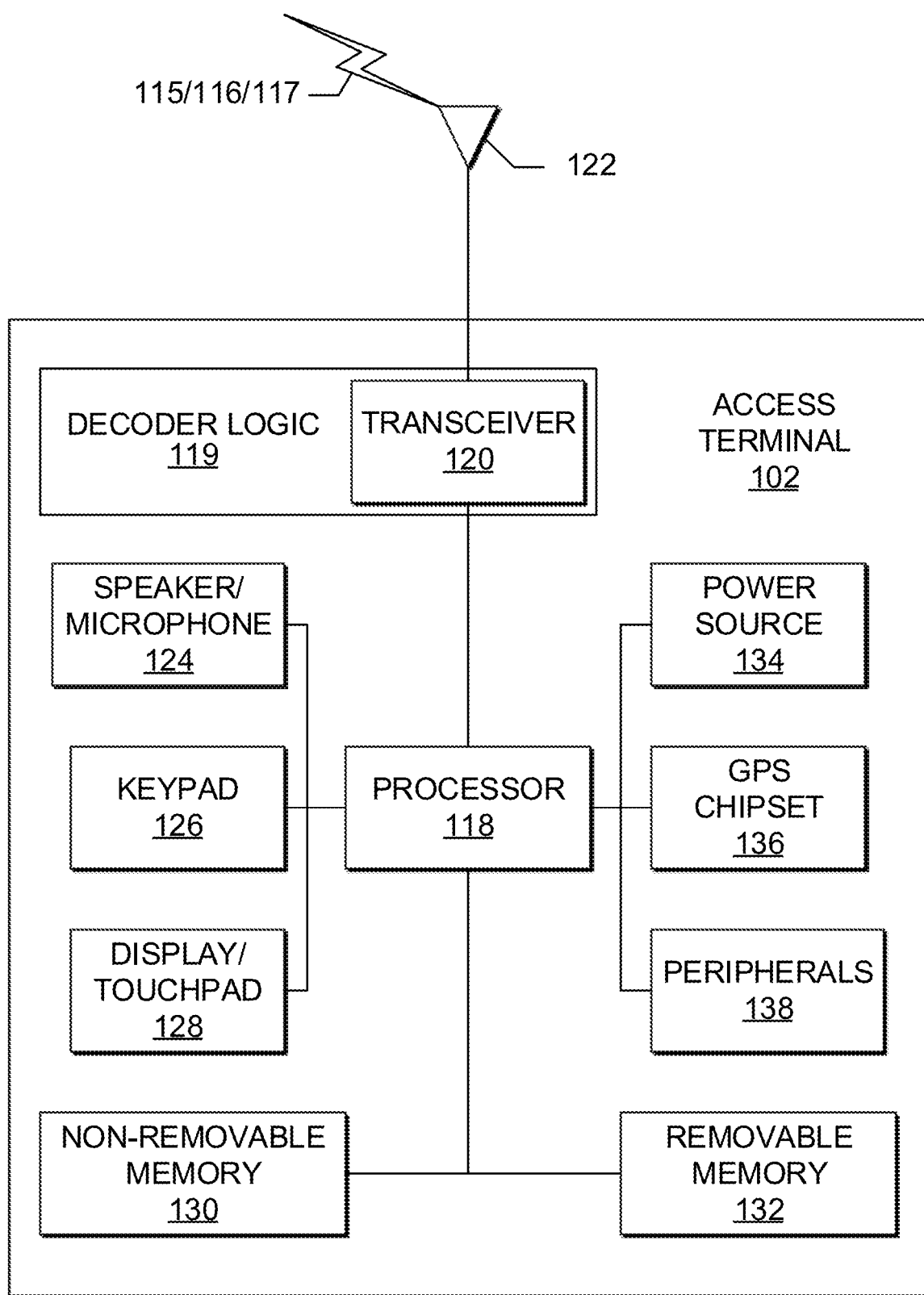
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
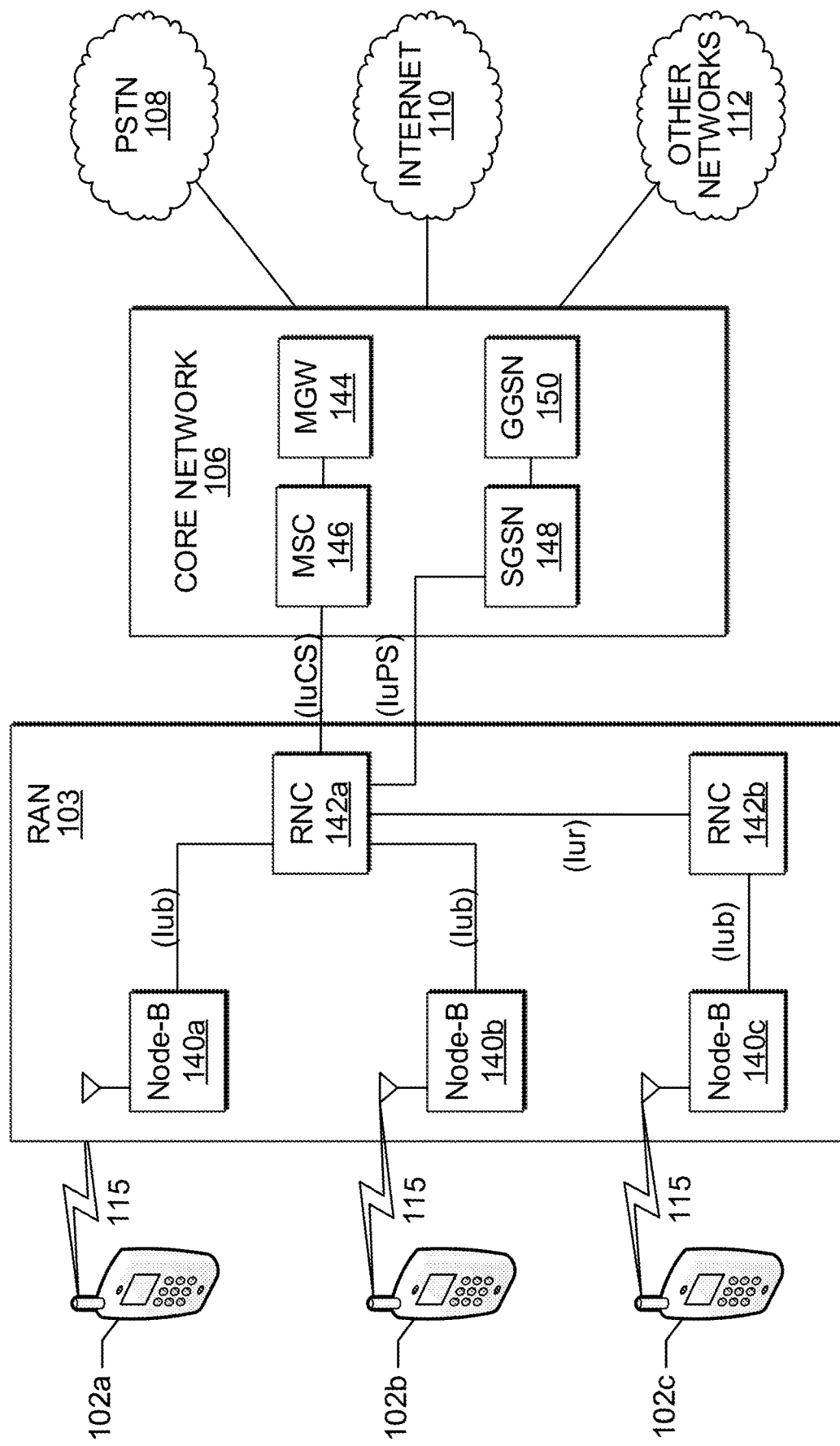
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 1D:
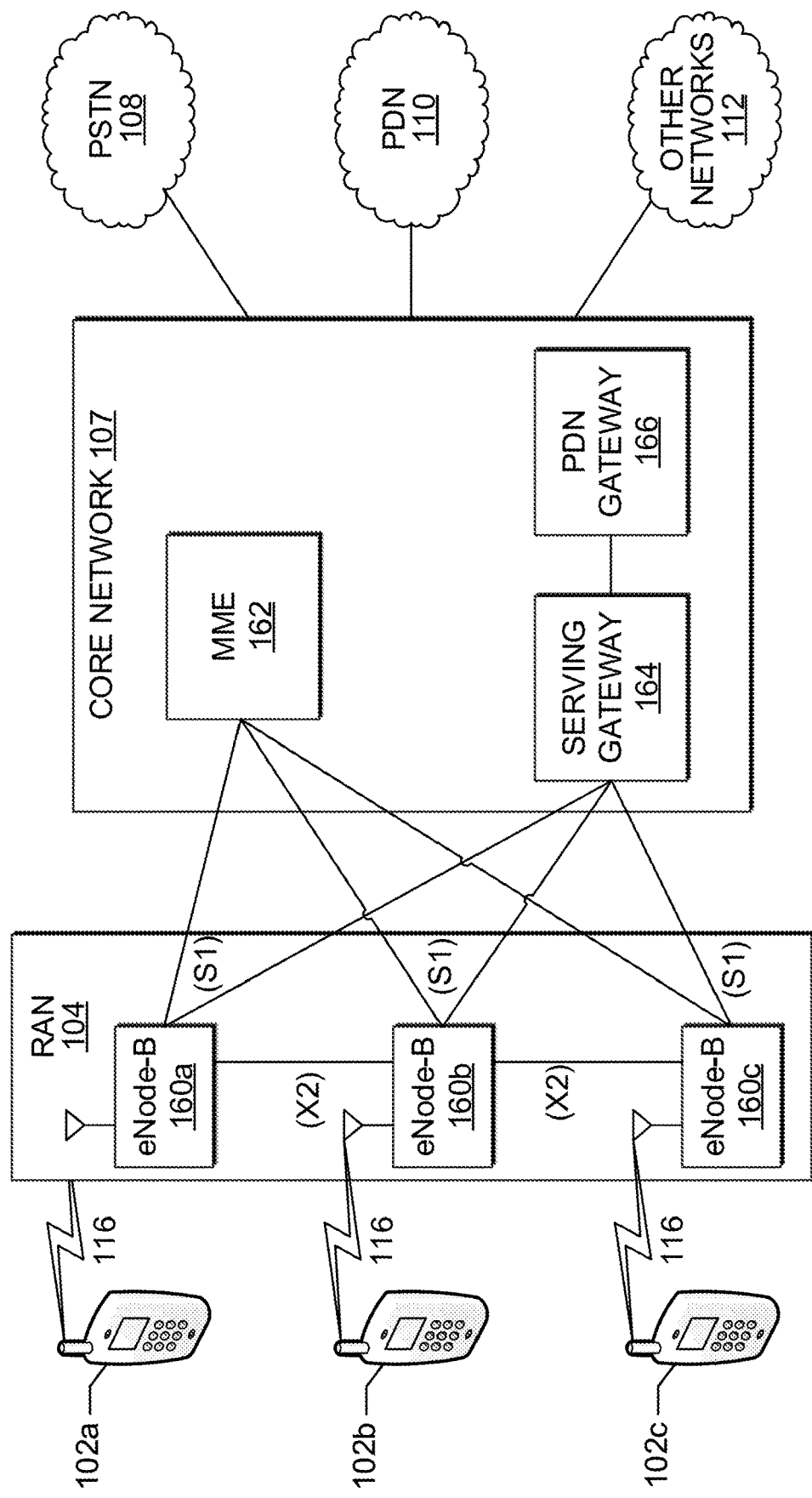
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 1D, the eNode Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 1E:
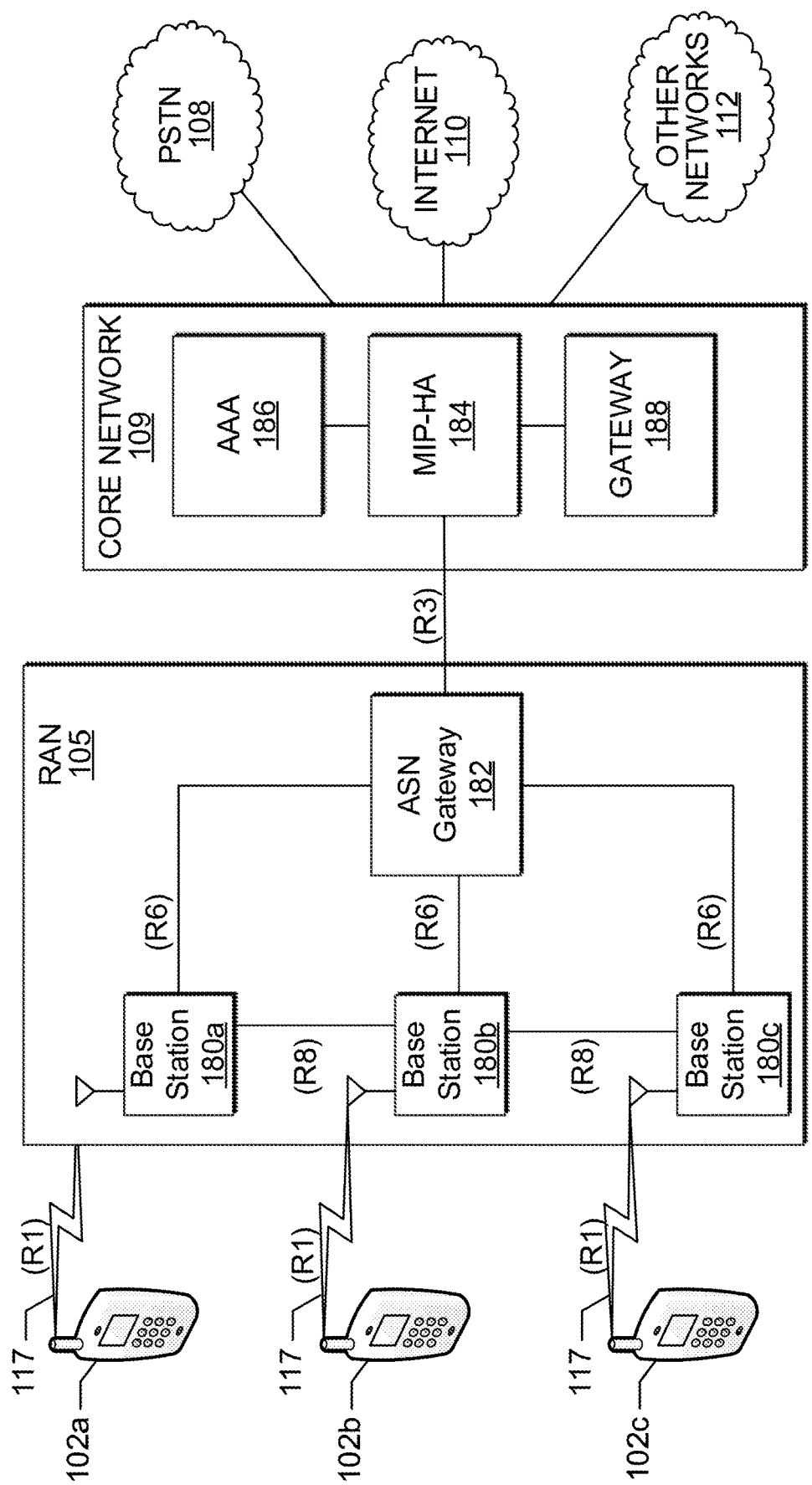
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MW-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
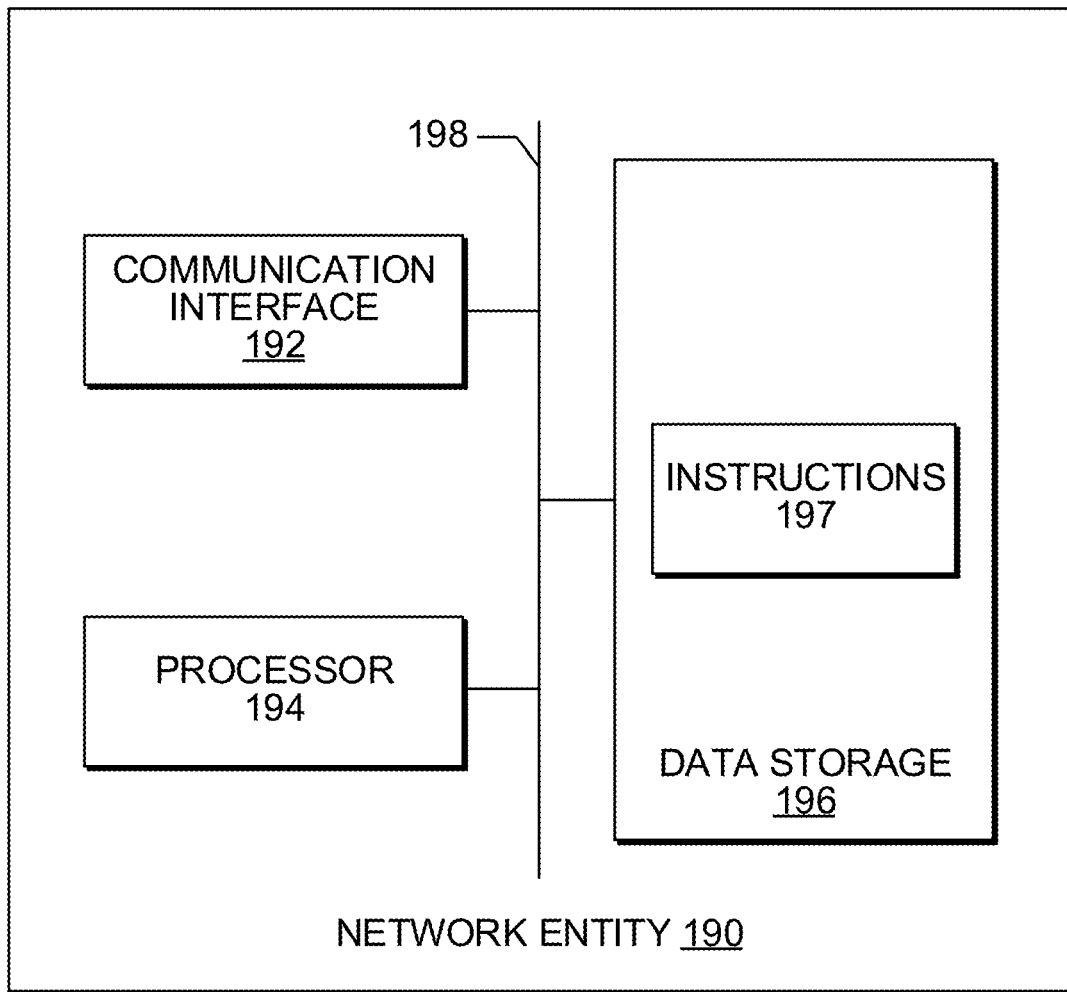
FIG. 1F depicts an example network entity that may be used within the communication system of FIG. 1A.
Figure 2:
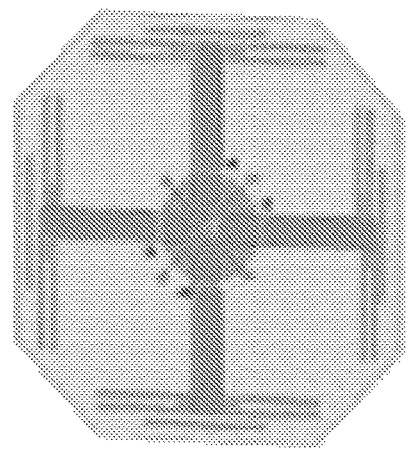
FIG. 2 illustrates exemplary reconfigurable antennas.
Figure 2:
Figure 2:
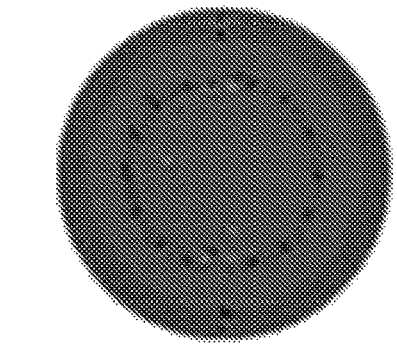
Figure 2:
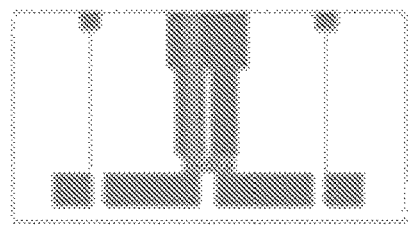
Figure 2:
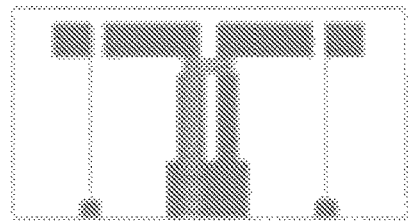

FIG. 1F depicts an example network entity 190 that may be used within the communication system 100 of FIG. 1A. As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, 802.11 communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node B 140a, Node B 140b, Node B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP HA 184, AAA 186, and gateway 188. And certainly other network entities and/or combinations of network entities could be used in various embodiments for carrying out the network-entity functions described herein, as the foregoing list is provided by way of example and not by way of limitation.

ABBREVIATIONS

Set forth below is terminology and abbreviations that are used throughout this disclosure.

BPCU: Bits Per Channel Use: Units for spectral efficiency.

SE: Spectral Efficiency, which may be measured in BPCU (bits per channel use).

EE: Energy Efficiency.

APM: Amplitude and/or Phase Modulation: Any conventional modulation technique that changes the amplitude, phase, or a combination of a baseline modulating signal as a means of transmitting information, e.g., ASK, PSK, QAM, etc.

RPM: Radiation Pattern/Polarization Modulation: A modulation technique that modulates information onto the different radiation patterns and/or polarization modes of an antenna.

RPD: Radiation Pattern/Polarization Diversity: A diversity scheme that uses different radiation patterns and/or polarization modes of an antenna to improve the quality of a wireless link.

Channel Use: An information theoretic based term that represents the time required for a symbol to be transmitted.

SSK: Space Shift Keying: A modulation technique that conveys information by activating one of many transmit antennas per channel use. The transmitted signal from each antenna will carry a unique spatial signature that can be decoded at the receiver, thereby constituting a transfer of information.

GSSK: Generalized Space Shift Keying: A modulation technique similar to SSK, except that more than one antenna is active for each channel use.

SM: Spatial Modulation: Combines SSK with conventional signal space modulation. In this case the active antenna will additionally transmit a conventional modulation symbol, (e.g., BPSK, QPSK, etc.). Note: Only one Tx RF chain is used.

GSM: Generalized Spatial Modulation: An extension of SM that is similar to the extension of SSK to GSSK. The difference being that in this case each antenna may carry a different modulation symbol if allowing for more than one Tx RF chain.

CSI: Channel State Information: Information that is used to define the propagation channel. In the most general sense this can be the channel transfer function.

ML: Maximum Likelihood: Common criteria used to design receiver structures.

MMSE: Minimum Mean Squared Error: Common criteria used to design receiver structures.

STBC: Space Time Block Coding: Time and Space Transmit Diversity Technique

SFBC: Space Frequency Block Coding: Frequency and Space Transmit Diversity Technique.

FSK: Frequency Shift Keying: A modulation technique conveys information by activating one of many frequency regions.

GFSK: Generalized Frequency Shift Keying: A modulation technique similar to FSK, except that more than one frequency region is active for each channel use.

FAPM: Frequency Amplitude and/or Phase Modulation: Combines FSK with conventional signal space modulation. In this case the active frequency region will additionally be used to transmit a conventional modulation symbol, (e.g., BPSK, QPSK, M-QAM, etc.).

GFAPM: Generalized Frequency Amplitude and/or Phase Modulation: Similar extension of APM, as from FSK to GFSK.

DCM: Dual carrier Modulation.

MCM: Multi-Carrier Modulation.

SMX: Spatial Multiplexing: Conventional MIMO technique used to increase SE.

$\lfloor x \rfloor_{2^\beta}$: The largest integer less than or equal to x that is an integer power of two.

$$\binom{n}{k} : \text{" } n \text{ choose } k \text{"} \frac{n!}{k!(n-k)!}$$

Maximizing spectral efficiency (SE) has historically been the main driver for technology development, while little attention has been paid to energy efficiency (EE). While conventional MIMO technology is recently responsible for some of the substantial increases in SE, it does so at the cost of increased circuit power dissipation at the transmitter as well as increased signal processing complexity at the receiver. SM-MIMO, which under some channel conditions may exhibit smaller increases in SE compared to conventional MIMO, can provide substantial gains in EE. Therefore, further developing SM-MIMO may lead to improved methods to strike a better balance between SE and EE than conventional MIMO techniques currently offer.

One aspect to make mMTC deployments feasible will be the ability to use low cost devices with significantly extended battery life. Keep in mind however, even though most current mMTC applications require a relatively low data rate, newer applications, which will undoubtedly emerge in the future, may have increased data rate requirements. Nevertheless, because of the large number of devices deployed for all of these applications, low cost devices with extended battery life will continue to be a key requirement. Designing systems using low cost devices that can further strike the proper balance between EE and SE in an operational mode will be critical for the successful deployment of the mMTC use case for 5G.

Note that 5G may be interchangeably used with New Radio or New Radio Access or New Radio interface in the invention.

The mMTC use case relies on the ability to design systems that strike the proper balance between the required SE while also enabling an extremely energy efficient design. The SM-MIMO concept may be leveraged for its low cost device architectures and energy efficient operation, while additional antenna based modulation and link adaptation techniques may be utilized to assure the maximum SE is being extracted from the channel. Especially with the requirements for higher frequency and wider bandwidth operation, it is desired to optimize the system design to improve the balance of SE and EE.

The present disclosure addresses these issues, and others.

Multi-Dimension modulation for high spectrum efficiency: In order to increase spectral efficiency for 5G and beyond or New Radio or New Radio Access or New Radio interface communications such as for the eMBB use case, it is desired to exploit all possible degrees (or dimensions) of freedom to transmit more information bits per channel use. Specifically, embodiments described methods and procedures for combining the time, frequency, spatial, and signal domains for multi-dimension modulation.

In addition, embodiments herein describe methods and procedures for enhanced spatial modulation. For example, in some embodiments disclosed are methods and procedures which leverage antenna and other dimensions' modulation for signal transmission. In some embodiments, it may be desired to optimize for the highest possible SE within a given EE constraint for low power applications such as mMTC.

Two-Dimensional scaled pair modulation: URLLC was defined as an important use case for 5G systems. In order to achieve high reliability under tight latency constraints, a new challenge on the modulation scheme design rises. In general, the wireless communication channel suffers from many impairments including noise, interference, and multipath fading. In the case of URLLC, the goal is to provide a much more robust transmission for a much smaller payload despite these inherent impairments. One performance target for URLLC is the support of mobility where the UE is moving at high speeds up to 500 km/h. An ultra-reliable channel estimate at these high Doppler environments is difficult to obtain, and such an accurate channel estimation in high Doppler scenarios requires a lot of overhead. One approach described herein to solve this problem is to use a non-coherent modulation scheme. Compared to the traditional differential modulation such as DBPSK or DQPSK, which is essentially phase shift modulation and sensitive to phase due to phase noise. The M-ary modulation is widely used in many communication system, and it might continue to be used for future communication systems, e.g., 5G. Hence, some embodiments apply the differential M-ary modulation. The embodiments described herein apply differential M-ary modulation so as to identify the phase difference between two M-ary symbols.

Ultra-High Reliability Low Latency (URLL) Modulation. Some embodiments disclosed herein describe methods and procedures which drive the reliability of transmissions to an order of magnitude higher than currently available. Methods such as HARQ, and enhanced channel coding, may achieve ultra-high reliability but at the cost of higher latency. In some embodiments, methods which enable high reliability without sacrificing latency are disclosed. These methods can achieve diversity gain to improve system performance and spectral efficiency. They also can mitigate the interference in case of co-channel coexistence of eMBB and URLLC.

Embodiments 1-3 below set forth exemplary solutions for the use of Multi-dimension modulation scheme to achieve higher SE while maintaining EE. By using switch-based parasitic antennas as information bearing elements, the baseline spatial modulation's spectral efficiency can be increased, while using the same number of antennas and Tx RF chains to keep EE.

Embodiment 1: Enhanced Spatial Modulation with Radiation Pattern and Polarization Modulation (RPM). In one embodiment, radiation pattern and/or polarization modulation (RPM) may be used. Combined with RPM, spatial modulation (SM) may be enhanced to increase spectral efficiency (SE), while maintaining and/or improving EE. Specifically, the embodiment may use one or more reconfigurable antennas to change their radiation pattern and polarization modes to modulate additional information onto the conventional SM-MIMO transmitted signal. By combining antenna pattern/polarization modulation with SM-MIMO, this scheme may increase the baseline SM-MIMO spectral efficiency, while using the same number of antennas and Tx RF chains.

Figure 3:
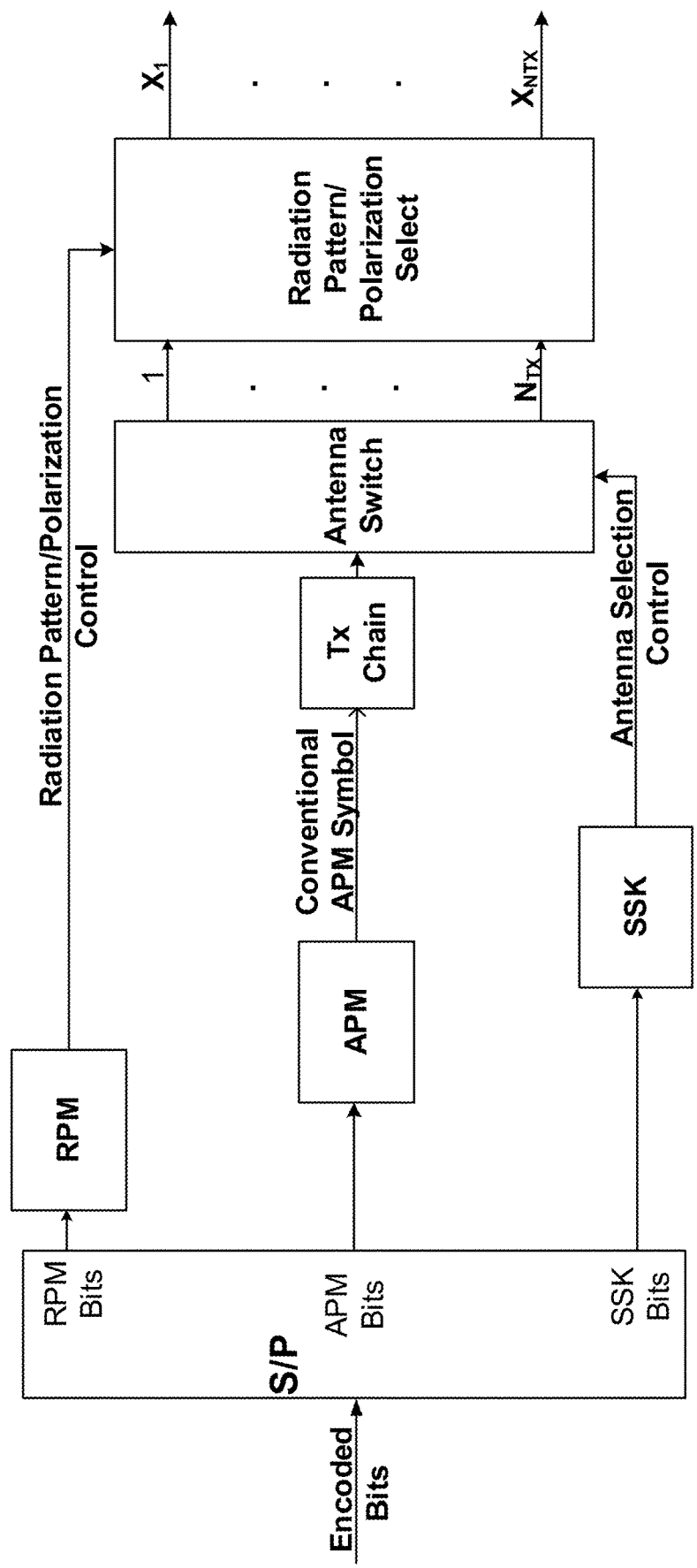
FIG. 3 is a functional block diagram for one embodiment of a transmitter with combined SM-MIMO and RPM.

In a first exemplary embodiment, information bits may be transmitted by using a Combined SM and RPM transmitter, a diagram of which is illustrated in FIG. 3.

For the Combined SM-MIMO and RPM system, a Transmitter Procedure associated with each channel use may include one or any combination of the following steps. In some further embodiments, additional steps may be included.

A set of encoded bits may be divided into Mg (e.g., Mg=3) groups of varying size, for example and without limitation: APM Group, SSK Group, and RPM Group. For the APM Group, the number of bits in this group may depend on the conventional signal space modulation order. E.g., QPSK: $M_{APM}=4$. For the SSK Group, the number of bits in this group may depend on the total number of transmit antennas, $N_{TX}$. For the RPM Group, the number of bits in this group may depend on the number of radiation patterns, polarization modes, and/or spatial modes that each antenna, or antenna port, may generate, $N_{RP}$.

The APM bits may be mapped onto a signal based modulation format.

The SSK bits may be mapped to a control signal indicating which one of the $N_{TX}$ antennas will be active for the current channel use.

The RPM bits may be mapped to a control signal(s) that select the radiation pattern, polarization, and/or spatial modes that each antenna or antenna port uses for the current channel use.

The conventional APM symbol may be modulated, up converted to the RF domain, and sent through the Tx RF chain.

The generated RF signal may be mapped onto the active antenna based on the SSK bits. This antenna may be configured to radiate the signal based on the RPM bits.

An encoding example is shown in Table 1 below.

In a related procedure, the procedure for the APM may consist of spatially modulated cross-polarized (x-pol) antennas. At the same time data for each channel's usage layer may be sent using spatial diversity with each x-pole antenna, e.g., using polarization diversity. This may be motivated by the observation that spatial diversity may be more likely to use a polarized transmission mode, however spatial modulation may be more likely to use uncorrelated antennas, e.g., either or both x-pol and distributed antennas.

To enable this method of transmission, feedback from the receiver may be required to inform the transmitter of the desired transmission mode. In such an example, there may be two modes of transmission: 1) polarization (x-pol) diversity transmission, and 2) spatial modulation (SM) transmission.

Feedback for x-pol transmission may include a pair of complex or polar weights for each cross-pole antenna. Note that an x-pol antenna may include a single x-pol antenna, or a group of x-pole antennas in close proximity (e.g., on a panel).

In an alternative embodiment, the x-pole feedback method may be done for each x-pole antenna. A polarization mode may be one or more of: 1) Horizontal (Theta), 2) Vertical (Phi), 3) Elliptic (Theta, Phi).

An indication of the Base Station antenna index, and/or antenna panel ID may be included in the transmission feedback.

An indication of the polarization degree, and/or rotation may also be indicated.

Feedback for SM may indicate to the transmitter the modulation format and associated coding rate (e.g., MCS) for SM.

TABLE 1

Mapping Example ($N_{TX}=2$, $N_{RP}=2$, $M_{APM}=4$)

| SSK Bits: [$b_1$] | RPM Bits: [$b_2$] | APM Bits [$b_3$, $b_4$] (QPSK) | $X = [x_1, x_2]$ |
|---|---|---|---|
| [0] | [0] | [0 0] | $[p_1 e^{j\frac{1\pi}{4}}, 0]$ |
| [0] | [0] | [0 1] | $[p_1 e^{j\frac{3\pi}{4}}, 0]$ |
| [0] | [0] | [1 0] | $[p_1 e^{j\frac{5\pi}{4}}, 0]$ |
| [0] | [0] | [1 1] | $[p_1 e^{j\frac{7\pi}{4}}, 0]$ |
| [0] | [1] | [0 0] | $[p_2 e^{j\frac{1\pi}{4}}, 0]$ |
| [0] | [1] | [0 1] | $[p_2 e^{j\frac{3\pi}{4}}, 0]$ |
| [0] | [1] | [1 0] | $[p_2 e^{j\frac{5\pi}{4}}, 0]$ |
| [0] | [1] | [1 1] | $[p_2 e^{j\frac{7\pi}{4}}, 0]$ |
| [1] | [0] | [0 0] | $[0, p_1 e^{j\frac{1\pi}{4}}]$ |
| [1] | [0] | [0 1] | $[0, p_1 e^{j\frac{3\pi}{4}}]$ |
| [1] | [0] | [1 0] | $[0, p_1 e^{j\frac{5\pi}{4}}]$ |
| [1] | [0] | [1 1] | $[0, p_1 e^{j\frac{7\pi}{4}}]$ |
| [1] | [1] | [0 0] | $[0, p_2 e^{j\frac{1\pi}{4}}]$ |
| [1] | [1] | [0 1] | $[0, p_2 e^{j\frac{3\pi}{4}}]$ |
| [1] | [1] | [1 0] | $[0, p_2 e^{j\frac{5\pi}{4}}]$ |
| [1] | [1] | [1 1] | $[0, p_2 e^{j\frac{7\pi}{4}}]$ |

Note:
$p_n$ represents the $n^{th}$ radiation pattern/polarization mode being selected.

Figure 4:
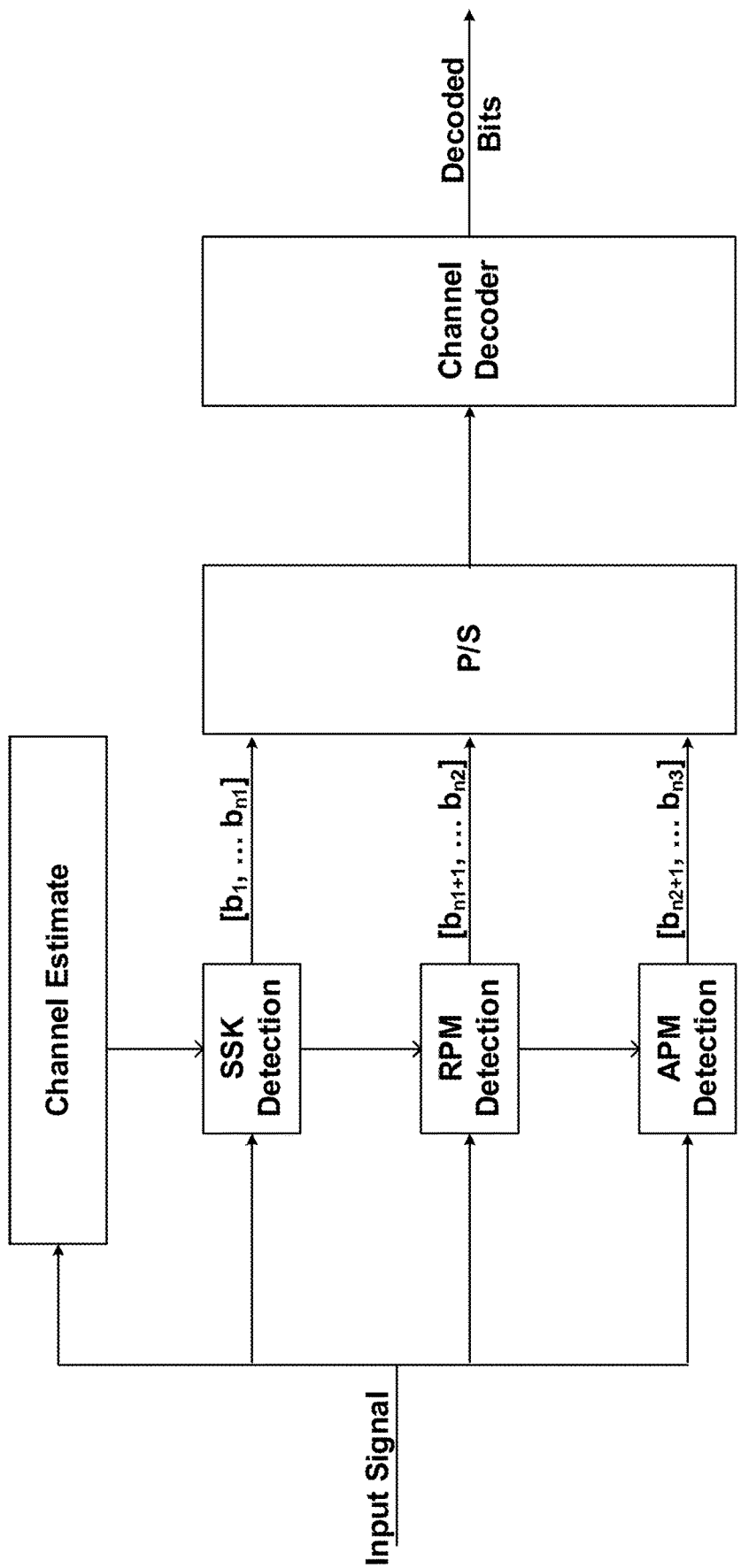
FIG. 4 is a functional block diagram for one embodiment of a receiver with combined SM-MIMO and RPM.

An exemplary Combined SM-MIMO and RPM receiver is illustrated in diagram form in FIG. 4.

For the Combined SM-MIMO and RPM system, a receive procedure for each receive channel use may include one or any combination of the following steps. In some further embodiments, additional steps may be included.

A signal may be received at the receiver exhibiting a unique spatial signature. The signature may be a function of the selected antenna, antenna panel, and/or radiation or antenna pattern used at the transmitter.

The signal may be demodulated and, using channel estimation, the bits may be detected using a receiver. The receiver may use any appropriate receiver structure, including an ML, MMSE, Zero Forcing (ZF), or successive interference cancelation (SIC) detector.

The SE can be written as follows:

$$SE = \log_2(\lfloor (N_{TX}) \rfloor_2 \beta) + \log_2(N_{RP}) + \log_2(M_{APM}) \, bpcu$$

Where,
$N_{TX}$ may indicate the total number of transmit antennas.
$N_{RP}$ may indicate the number of radiation patterns/polarization modes available for each antenna.
$M_{APM}$ may indicate the conventional signal space modulation order.

The channel decoder may be optimized for each mode of reception in FIG. 4. The receiver may utilize a procedure for ensuring the correct mode of reception is used. For example, the channel decoder soft mapping procedure may be different for SSK, APM, and RPM reception respectively. In some embodiments, the receiver may provide log likelihood estimates that are unique for each reception mode.

In a related embodiment the methods and procedures for a large number of antennas may be considered (e.g., Massive MIMO). In this case the solutions herein may be extended to apply to Massive Multi-User (MU) MIMO.

For massive MU-MIMO (mMU-MIMO) the antenna index $I_g$, and antenna group index $I_{ag}$, and/or antenna panel index $I_{gp}$, may be defined for antenna spatial, or antenna radiation, pattern modulation.

In this case the total number of transmit antennas $N_{TX}$ may belong to a subset of an antenna group index $I_{ag}$, and/or antenna panel index $I_{gp}$. $N_{TX}$ may be much larger than the degrees of freedom supported by the system and/or channel.

An antenna group may correspond, or be associated, to a specific set of users in a downlink multi-user (e.g., mMU-MIMO) scenario. An antenna group may include more than one antenna on one or more antenna panels.

For mMU-MIMO the receiver may be a simple single tap matched filter for each channel. In some cases, other receiver structures may be used.

In a second exemplary embodiment, information bits may be transmitted by using a Combined Single RF chain GSM and RPM transmitter. Note that the transmitter may generally be the same as in FIG. 3, however, in this method multiple antennas may be simultaneously active for each channel use.

A transmit procedure for each channel use may include one or any combination of the following steps. In some further embodiments, additional steps may be included.

A set of encoded bits may be divided into Mg (e.g., Mg=3) groups of varying size: APM Group, SSK Group, and RPM Group. For the APM Group, the number of bits in this group may depend on the conventional signal space modulation order. E.g., QPSK: $M_{APM}$=4. For the SSK Group, the number of bits in this group may depend on the total number of transmit antennas, $N_{TX}$ as well as the number of active antennas, $N_{TX\_act}$ per channel use. For the RPM Group, the number of bits in this group may depend on the number of radiation patterns and/or polarization modes that each antenna can generate, $N_{RP}$.

The APM bits may be mapped onto a signal based modulation format.

The SSK bits may be mapped to a control signal indicating which set of $N_{TX\_act}$ antennas of the $N_{TX}$ antennas may be active for the current channel use.

The RPM bits may be mapped to a control signal(s) that selects the radiation pattern and/or polarization mode which is used for the current channel use.

The conventional APM symbol may be modulated, up converted to the RF domain, and sent through the Tx RF chain.

The generated RF signal may be mapped onto the active antennas using the SSK bits. The antennas may be configured to radiate the signal based on the RPM bits.

An encoding example is shown in Table 2.

TABLE 2

Mapping Example (($N_{TX}$ = 4, $N_{TX\_act}$ = 2, $N_{RP}$ = 2, $M_{APM}$ = 2))

| GSSK Bits: [$b_1$, $b_2$] | RPM Bits: [$b_3$] | APM Bits [$b_4$] (BPSK) | X = [$x_1$, $x_2$, $x_3$, $x_4$] |
|---|---|---|---|
| [0 0] | [0] | [0] | [$p_1 e^{j0}$, 0, $p_1 e^{j0}$, 0] |
| [0 0] | [0] | [1] | [$p_1 e^{j\pi}$, 0, $p_1 e^{j\pi}$, 0] |
| [0 0] | [1] | [0] | [$p_2 e^{j0}$, 0, $p_2 e^{j0}$, 0] |
| [0 0] | [1] | [1] | [$p_2 e^{j\pi}$, 0, $p_2 e^{j\pi}$, 0] |
| [0 1] | [0] | [0] | [0, $p_1 e^{j0}$, 0, $p_1 e^{j0}$] |
| [0 1] | [0] | [1] | [0, $p_1 e^{j\pi}$, 0, $p_1 e^{j\pi}$] |
| [0 1] | [1] | [0] | [0, $p_2 e^{j0}$, 0, $p_2 e^{j0}$] |
| [0 1] | [1] | [1] | [0, $p_2 e^{j\pi}$, 0, $p_2 e^{j\pi}$] |
| [1 0] | [0] | [0] | [$p_1 e^{j0}$, 0, 0, $p_1 e^{j0}$] |
| [1 0] | [0] | [1] | [$p_1 e^{j\pi}$, 0, 0, $p_1 e^{j\pi}$] |
| [1 0] | [1] | [0] | [$p_2 e^{j0}$, 0, 0, $p_2 e^{j0}$] |
| [1 0] | [1] | [1] | [$p_2 e^{j\pi}$, 0, 0, $p_2 e^{j\pi}$] |
| [1 1] | [0] | [0] | [0, $p_1 e^{j0}$, $p_1 e^{j0}$, 0] |
| [1 1] | [0] | [1] | [0, $p_1 e^{j\pi}$, $p_1 e^{j\pi}$, 0] |
| [1 1] | [1] | [0] | [0, $p_2 e^{j0}$, $p_2 e^{j0}$, 0] |
| [1 1] | [1] | [1] | [0, $p_2 e^{j\pi}$, $p_2 e^{j\pi}$, 0] |

Note:
$p_n$ represents the $n^{th}$ radiation pattern/polarization mode being selected.

A receive procedure for each channel use may include one or any combination of the following steps. In some further embodiments, additional steps may be included.

A signal may be received at the receiver exhibiting a unique spatial signature. The signature may be dependent on the antenna and polarization mode that has been used.

The signal may be demodulated and, using channel estimation, the bits may be detected using a suitable receiver structure (e.g., ML, MMSE, ZF, SIC).

The SE may be written as follows:

$$SE = \log_2\left(\left\lfloor \binom{N_{TX}}{N_{TX\_act}} \right\rfloor_{2^\beta}\right) + \log_2(N_{RP}) + \log_2(M_{APM}) bpcu$$

Where,
$N_{TX}$ may indicate the total number of transmit antennas.
$N_{TX\_act}$ may indicate the number of active transmit antennas per channel use.
$N_{RP}$ may indicate the number of radiation patterns/polarization modes available for each antenna.
$M_{APM}$ may indicate the conventional signal space modulation order.

Embodiment 2: Multi-Dimensional Modulation with RPM. In one embodiment enhanced spatial modulation with RPM may be further extended to more dimensions such as frequency, time, and/or bit domain.

Figure 5:
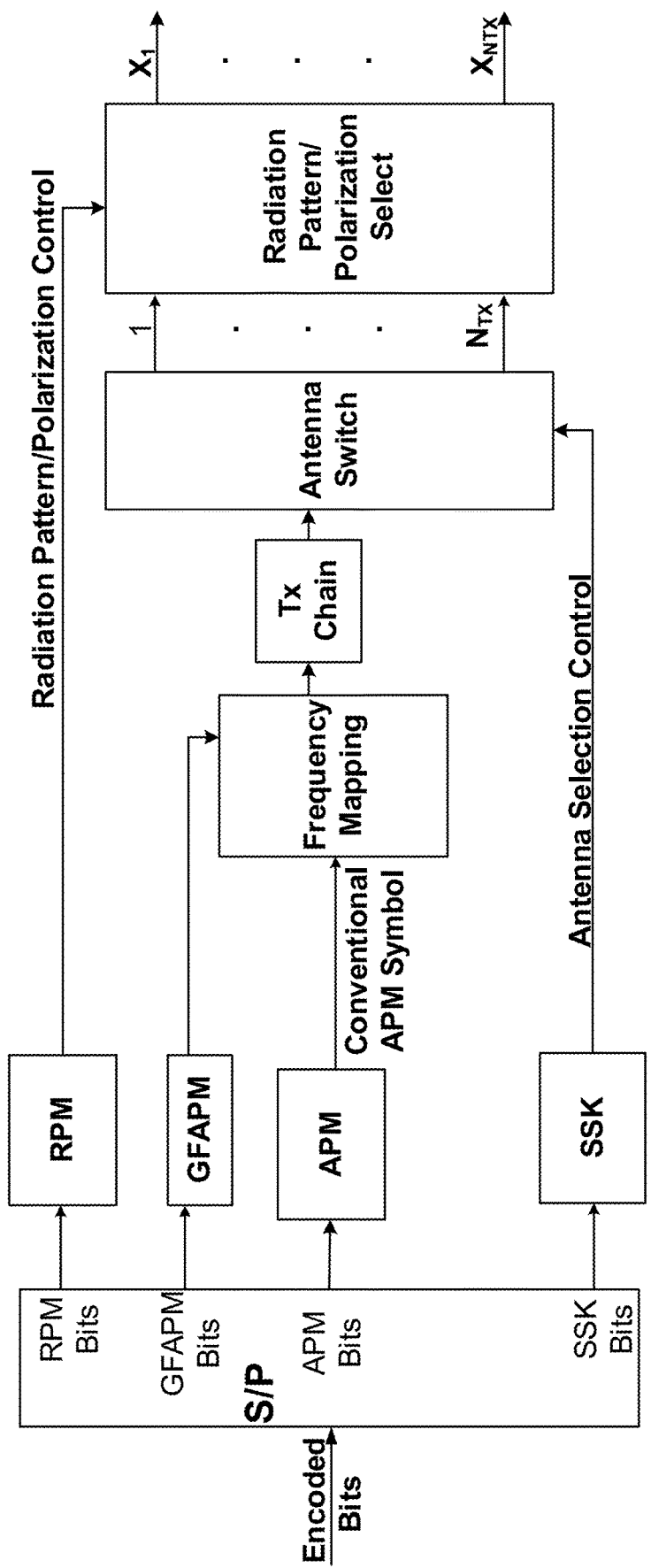
FIG. 5 is a functional block diagram for one embodiment of a transmitter with combined SM-MIMO, RPM, and GFAPM.

In one instance, a method may further extend the enhanced spatial modulation using RPM to the frequency domain by combining GFAPM. One exemplary implementation may transmit information bits by using the Combined SM, RPM and GFAPM, which is shown in FIG. 5.

A transmit procedure for each channel use may include one or any combination of the following steps. In some further embodiments, additional steps may be included.

A set of encoded bits may be divided into Mg (e.g., Mg=4) groups of varying size: APM Group, SSK Group, RPM Group, and GFAPM Group. For the APM Group, the number of bits in this group may depend on the conventional signal space modulation order. E.g., QPSK: $M_{APM}$=4. For the SSK Group, the number of bits in this group may depend on the total number of transmit antennas, $N_{TX}$. For the RPM Group, the number of bits in this group may depend on the number of radiation patterns and/or polarization modes that each antenna may be configured to generate, $N_{RP}$. For the GFAPM Group, the number of bits in this group may depend on the total number of frequency subcarriers, $N_{SC}$ and the number of active frequency subcarriers, $N_{SC\_act}$ per channel use.

The APM bits may be mapped onto a signal based modulation format.

The GFAPM bits may be mapped to a control a signal indicating which of the $N_{SC}$ subcarriers will be used for the current channel use.

The SSK bits may be mapped to a control signal indicating which one of the $N_{TX}$ antennas will be active for the current channel use.

The RPM bits may be mapped to a control signal(s) that selects the radiation pattern and/or polarization mode used for the current channel use.

The conventional APM symbol may be modulated, up converted to the RF domain, and sent through the Tx RF chain.

The generated RF signal may be mapped onto the active antenna based on the SSK bits. This antenna may be configured to radiate the signal based on the RPM bits.

An encoding example is shown in Table 3.

TABLE 3

Mapping Example (($N_{TX}$ = 2, $N_{SC}$ = 2, $N_{SC\_act}$ = 1, $N_{RP}$ = 2, $M_{APM}$ = 2)

| SSK Bits: [$b_1$] | RPM Bits: [$b_2$] | APM Bits [$b_3$] (BPSK) | GFAPM Bits [$b_4$] | X = [$x_1$, $x_2$] |
|---|---|---|---|---|
| [0] | [0] | [0] | [0] | [$p_1 e^{j(2\pi f_1 + 0)}$, 0] |
| [0] | [0] | [0] | [1] | [$p_1 e^{j(2\pi f_2 + 0)}$, 0] |
| [0] | [0] | [1] | [0] | [$p_1 e^{j(2\pi f_1 + \pi)}$, 0] |
| [0] | [0] | [1] | [1] | [$p_1 e^{j(2\pi f_2 + \pi)}$, 0] |
| [0] | [1] | [0] | [0] | [$p_2 e^{j(2\pi f_1 + 0)}$, 0] |
| [0] | [1] | [0] | [1] | [$p_2 e^{j(2\pi f_2 + 0)}$, 0] |
| [0] | [1] | [1] | [0] | [$p_2 e^{j(2\pi f_1 + \pi)}$, 0] |
| [0] | [1] | [1] | [1] | [$p_2 e^{j(2\pi f_2 + \pi)}$, 0] |
| [1] | [0] | [0] | [0] | [0, $p_1 e^{j(2\pi f_1 + 0)}$] |
| [1] | [0] | [0] | [1] | [0, $p_1 e^{j(2\pi f_2 + 0)}$] |
| [1] | [0] | [1] | [0] | [0, $p_1 e^{j(2\pi f_1 + \pi)}$] |
| [1] | [0] | [1] | [1] | [0, $p_1 e^{j(2\pi f_2 + \pi)}$] |
| [1] | [1] | [0] | [0] | [0, $p_2 e^{j(2\pi f_1 + 0)}$] |
| [1] | [1] | [0] | [1] | [0, $p_2 e^{j(2\pi f_2 + 0)}$] |
| [1] | [1] | [1] | [0] | [0, $p_2 e^{j(2\pi f_1 + \pi)}$] |
| [1] | [1] | [1] | [1] | [0, $p_2 e^{j(2\pi f_2 + \pi)}$] |

Note:
$p_n$ represents the $n^{th}$ radiation pattern/polarization mode being selected.

A receive procedure for each channel use may include one or any combination of the following steps. In some further embodiments, additional steps may be included.

A signal may be received at the receiver exhibiting a unique spatial signature. The signature may depend on the selected antenna, the radiation pattern, and frequency carrier that was used at the transmitter.

The signal may be demodulated and, using channel estimation, the bits may be detected using a suitable receiver structure (e.g., ML, MMSE, ZF, SIC).

The SE may be written as follows:

$$SE = \log_2(\lfloor (N_{TX}) \rfloor_{2^\beta}) + \log_2\left(\left\lfloor \binom{N_{SC}}{N_{SC\_act}} \right\rfloor_{2^\beta}\right) + \log_2(N_{RP}) + \log_2(M_{APM}) bpcu$$

Where, $N_{TX}$ may indicate the total number of transmit antennas.

$N_{SC}$ may indicate the total number of frequency subcarriers available.

$N_{SC\_act}$ may indicate the active number of frequency subcarriers for each channel use.

$N_{RP}$ may indicate the number of radiation patterns/polarization modes available for each antenna.

$M_{APM}$ may indicate the conventional signal space modulation order.

Figure 6:
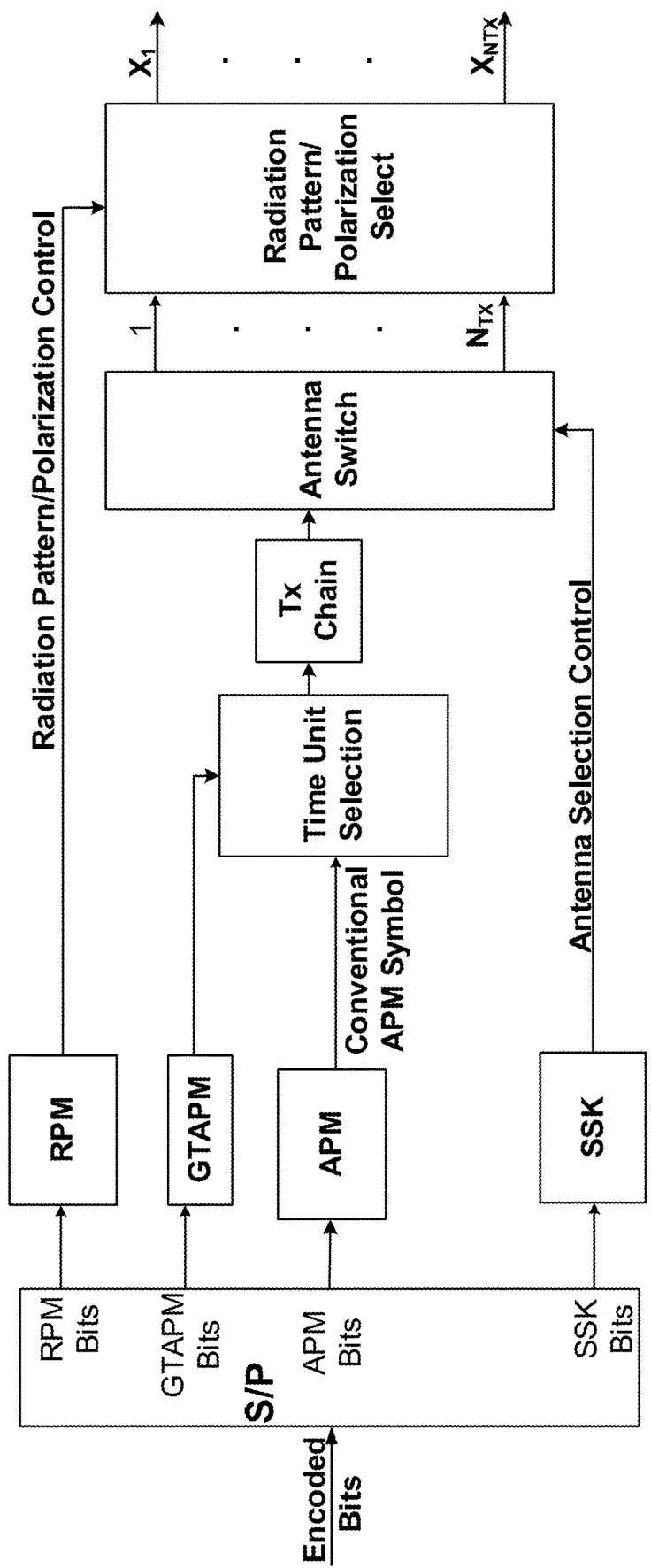
FIG. 6 is a functional block diagram for one embodiment of a transmitter with combined SM-MIMO, RPM, and GTAPM.

Another method may further extend the enhanced spatial modulation with RPM using a time domain approach by further combining with GTAPM. An exemplary implementation may transmit information bits by using the Combined SM, RPM and GTAPM, which is shown in FIG. 6.

A transmit procedure for each channel use may include one or any combination of the following steps. In some further embodiments, additional steps may be included.

A set of encoded bits may be divided into Mg (e.g., Mg=4) groups of varying size: APM Group, SSK Group, RPM Group, and GTAPM Group. For the APM Group, the number of bits in this group may depend on the conventional signal space modulation order. E.g., QPSK: $M_{APM}$=4. For the SSK Group, the number of bits in this group may depend on the total number of transmit antennas, $N_{TX}$. For the RPM Group, the number of bits in this group may depend on the number of radiation patterns and/or polarization modes that each antenna may generate, $N_{RP}$. For the GTAPM Group, the number of bits in this group may depend on the total number of time units, $N_{TU}$ and the number of active time units, $N_{TU\_act}$ per channel use.

The APM bits may be mapped onto a signal based modulation format.

The GTAPM bits may be mapped to a control a signal indicating which of the $N_{TU}$ time units will be used for the current channel use.

The SSK bits may be mapped to a control signal indicating which one of the $N_{TX}$ antennas will be active for the current channel use.

The RPM bits may be mapped to a control signal(s) that select the radiation pattern and/or polarization mode used for the current channel use.

The conventional APM symbol may be modulated, up converted to the RF domain, and sent through the Tx RF chain.

The generated RF signal may be mapped onto the active antenna based on the SSK bits. This antenna may be configured to transmit the signal using an indication from the RPM bits.

An encoding example is shown in Table 4.

TABLE 4

Mapping Example (($N_{TX}$ = 2, $N_{TU}$ = 2, $N_{TU\_act}$ = 1, $N_{RP}$ = 2, $M_{APM}$ = 2)

| SSK Bits: [$b_1$] | RPM Bits: [$b_2$] | APM Bits [$b_3$] (BPSK) | GTAPM Bits [$b_4$], Time Unit Index [t] | X = [$x_{1,t1}$, $x_{2,t1}$], [$x_{1,t2}$, $x_{2,t2}$] |
|---|---|---|---|---|
| [0] | [0] | [0] | [0] | [$p_1 e^{j0}$, 0], [0, 0] |
| [0] | [0] | [0] | [1] | [0, 0], [$p_1 e^{j0}$, 0] |
| [0] | [0] | [1] | [0] | [$p_1 e^{j\pi}$, 0], [0, 0] |
| [0] | [0] | [1] | [1] | [0, 0], [$p_1 e^{j\pi}$, 0] |
| [0] | [1] | [0] | [0] | [$p_2 e^{j0}$, 0], [0, 0] |
| [0] | [1] | [0] | [1] | [0, 0], [$p_2 e^{j0}$, 0] |
| [0] | [1] | [1] | [0] | [$p_2 e^{j\pi}$, 0], [0, 0] |
| [0] | [1] | [1] | [1] | [0, 0], [$p_2 e^{j\pi}$, 0] |
| [1] | [0] | [0] | [0] | [0, $p_1 e^{j0}$], [0, 0] |
| [1] | [0] | [0] | [1] | [0, 0], [0, $p_1 e^{j0}$] |

TABLE 4-continued

Mapping Example (($N_{TX}$ = 2, $N_{TU}$ = 2, $N_{TU\_act}$ = 1, $N_{RP}$ = 2, $M_{APM}$ = 2)

| SSK Bits: [$b_1$] | RPM Bits: [$b_2$] | APM Bits [$b_3$] (BPSK) | GTAPM Bits [$b_4$], Time Unit Index [t] | X = [$x_{1,t1}$, $x_{2,t1}$], [$x_{1,t2}$, $x_{2,t2}$] |
|---|---|---|---|---|
| [1] | [0] | [1] | [0] | [0, $p_1e^{j\pi}$], [0, 0] |
| [1] | [0] | [1] | [1] | [0, 0], [0, $p_1e^{j\pi}$] |
| [1] | [1] | [0] | [0] | [0, $p_2e^{j0}$], [0, 0] |
| [1] | [1] | [0] | [1] | [0, 0], [0, $p_2e^{j0}$] |
| [1] | [1] | [1] | [0] | [0, $p_2e^{j\pi}$], [0, 0] |
| [1] | [1] | [1] | [1] | [0, 0], [0, $p_2e^{j\pi}$] |

Note:
$p_n$ represents the $n^{th}$ radiation pattern/polarization mode being selected.

A receive procedure for each channel use may include one or any combination of the following steps. In some further embodiments, additional steps may be included.

A signal may be received at the receiver exhibiting a unique spatial signature. The signature may depend on the selected antenna, the radiation pattern, and frequency carrier that was used at the transmitter.

The signal may be demodulated and, using channel estimation, the bits may be detected using a suitable receiver structure (e.g., ML, MMSE, ZF, SIC).

The SE may be written as follows:

$$SE = \log_2(\lfloor(N_{TX})\rfloor_{2\beta}) + \log_2\left(\left\lfloor\binom{N_{TU}}{N_{TU\_act}}\right\rfloor_{2\beta}\right) + \log_2(N_{RP}) + \log_2(M_{APM}) bpcu$$

Where,
- $N_{TX}$ may indicate the total number of transmit antennas.
- $N_{TU}$ may indicate the total number of time units available.
- $N_{TU\_act}$ may indicate the active number of time units for each channel use.
- $N_{RP}$ may indicate the number of radiation patterns/polarization modes available for each antenna.
- $M_{APM}$ may indicate the conventional signal space modulation order.

In further embodiments, the method may extend the enhanced spatial modulation with RPM to both frequency domain and time domain by further combining with both GFAPM and GTAPM.

Embodiment 3: Enhanced Spatial Modulation with Transmit Diversity. In another embodiment, methods may enhance GSM with FAPM and transmit diversity schemes such as SFBC and/or STBC to achieve diversity gain in space, time, and frequency domains simultaneously. This may improve the SE and throughput at low SINR situations, such as at cell edges. For example, the Alamouti code may be used for both the frequency and time transmit diversity. To accommodate the spatial diversity, multiple Tx RF chains may be required.

Figure 7:
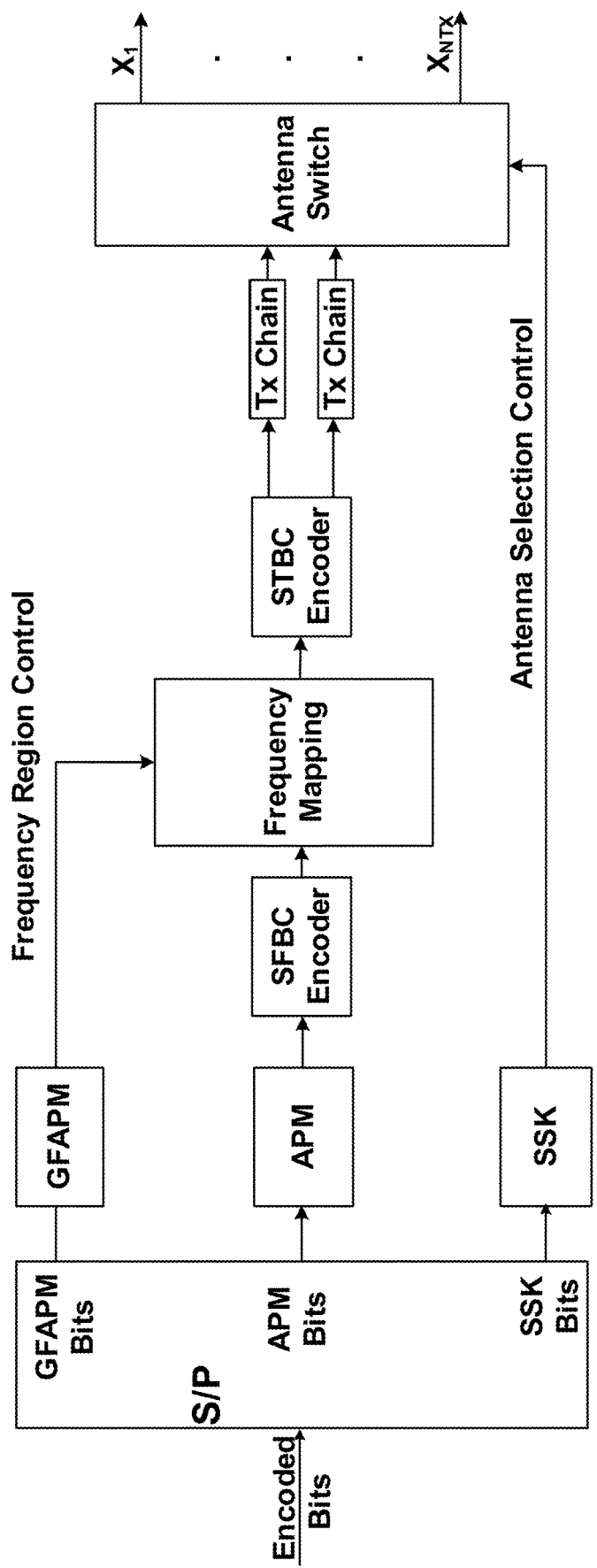
FIG. 7 is a functional block diagram for one embodiment of a transmitter with combined GSM-MIMO, GFAPM, SFBC, and STBC.

An illustrative exemplary implementation is provided for this new transmission technique as shown in FIG. 7: Enhanced GSM with GFAPM and Transmit Diversity. Note that while the exemplary implementation uses 2 level transmit diversity with two Tx RF chains, the disclosure is not necessarily limited in this manner.

A transmit procedure for each channel use may include one or any combination of the following steps. In some further embodiments, additional steps may be included.

A set of encoded bits may be divided into Mg (e.g., Mg=3) groups of varying size: APM Group, SSK Group, and GFAPM Group. For the APM Group, the number of bits in this group may depend on the conventional signal space modulation order. E.g., BPSK: $M_{APM}$=2. For the SSK Group, the number of bits in this group may depend on the number of combinations of $N_{TX}$ antennas we can make using $N_{sdiv}$ antennas at a time, where $N_{sdiv}$ is the diversity order used, (i.e., $$\binom{N_{TX}}{N_{sdiv}}).$$

For the GFAPM Group, the number of bits in this group may depend on the number of combinations of $N_{SC}$ frequency subcarriers we can make using $N_{fdiv}$ at a time, where $N_{fdiv}$ is the diversity order used, (i.e., $$\binom{N_{SC}}{N_{fdiv}}).$$

The APM bits may be mapped onto a signal based modulation format.

The SSK bits may be mapped to a control signal indicating which antennas may be active for the current channel use.

The GFAPM bits may be mapped to a control signal indicating which subcarrier may be used for the current channel use.

The conventional APM symbols may be mapped to the selected frequency subcarriers via an SFBC encoder, which are then sent to the STBC encoder for a second level of diversity encoding using the time dimension.

The outputs from the STBC encoder may then modulated, up converted to the RF domain, and passed through the two Tx RF chains.

The generated RF signals may then be mapped onto the active antennas as indicated by the SSK bits.

An encoding example is shown in Table 5.

TABLE 5

STFBC-GFAPM-SM-MIMO Encoding Example for 2 Channel Uses [BPSK, $N_{TX}$ = 4, $N_{sdiv}$ = 2, $N_{SC}$ = 4, $N_{fdiv}$ = 2]

| APM Bits: [$b_1$, $b_2$] [$b_1$, $b_2$] = [0 0], [0 1], [1 0], [1 1] | SSK Bits: [$b_3$, $b_4$] | GFAPM Bits [$b_5$], [$b_6$] | Active Antenna Index A = [$a_1$ $a_2$ $a_3$ $a_4$], See Note 2 |
|---|---|---|---|
| [b1, b2] | [0, 0] | [0 0] | [1 1 0 0] |
| [b1, b2] | [0, 0] | [0 1] | [1 1 0 0] |
| [b1, b2] | [0, 0] | [1 0] | [1 1 0 0] |
| [b1, b2] | [0, 0] | [1 1] | [1 1 0 0] |
| [b1, b2] | [0, 1] | [0 0] | [0 0 1 1] |
| [b1, b2] | [0, 1] | [0 1] | [0 0 1 1] |
| [b1, b2] | [0, 1] | [1 0] | [0 0 1 1] |
| [b1, b2] | [0, 1] | [1 1] | [0 0 1 1] |
| [b1, b2] | [1, 0] | [0 0] | [0 1 1 0] |
| [b1, b2] | [1, 0] | [0 1] | [0 1 1 0] |
| [b1, b2] | [1, 0] | [1 0] | [0 1 1 0] |
| [b1, b2] | [1, 0] | [1 1] | [0 1 1 0] |
| [b1, b2] | [1, 1] | [0 0] | [1 0 0 1] |
| [b1, b2] | [1, 1] | [0 1] | [1 0 0 1] |

TABLE 5-continued

STFBC-GFAPM-SM-MIMO Encoding Example for 2 Channel Uses
[BPSK, $N_{TX}$ = 4, $N_{sdiv}$ = 2, $N_{SC}$ = 4, $N_{fdiv}$ = 2]

| APM Bits: [$b_1$, $b_2$] [$b_1$, $b_2$] = [0 0], [0 1], [1 0], [1 1] | SSK Bits: [$b_3$, $b_4$] | GFAPM Bits [$b_5$], [$b_6$] | Active Antenna Index A = [$a_1$ $a_2$ $a_3$ $a_4$], See Note 2 |
|---|---|---|---|
| [b1, b2] | [1, 1] | [1 0] | [1 0 0 1] |
| [b1, b2] | [1, 1] | [1 1] | [1 0 0 1] |

Note 1:
The table above would be replicated four times for each combination of APM bits.

Note 2:
The last column does not explicitly show the data at each antenna since it will be an encoded version of the original data over two channel used. Instead the column indicates which antennas are active for the two channel uses. The frequency subcarrier is also encoded in the data and not shown.

A receive procedure for each channel use may include one or any combination of the following steps. In some further embodiments, additional steps may be included.

A signal may be received at the receiver exhibiting a unique spatial signature. The signature may depend on the selected antenna, the radiation pattern, and frequency carrier that was used at the transmitter.

The signal may be demodulated and, using channel estimation, the bits may be detected using a suitable receiver structure (e.g., ML, MMSE, ZF, SIC).

In addition, one of a variety of conventional diversity combining technique (e.g., Alamouti decoding) can be used to take advantage of the diversity introduced at the transmitter.

With the example encoding shown in Table 5, with $N_{sdiv}=N_{fdiv}=2$, the SE may be written as follows:

$$SE = \frac{1}{2}\left[\log_2\left(\left\lfloor\binom{N_{TX}}{N_{sdiv}}\right\rfloor_{2\beta}\right) + \log_2\left(\left\lfloor\binom{N_{SC}}{N_{fdiv}}\right\rfloor_{2\beta}\right)\right] + \log_2(M_{APM})bpcu$$

where, $N_{TX}$ may indicate the total number total transmit antenna;
$N_{SC}$ may indicate the total number of frequency subcarriers; and
$M_{APM}$ may indicate the conventional signal space modulation order.

Note that the ½ factor is from the fact that a specific transmit antenna pair remains constant for two channel uses.

Embodiment 4: Two-dimensional Scaled Pair Modulation. In another embodiment, a two-dimensional scaled pair modulation scheme may be utilized to address issues raised above, which may allow non-coherent communications for any M-ary modulations that may bear information bits by phase and/or amplitude, e.g., 16 QAM. This two-dimensional scaled pair modulation scheme may facilitate the use cases or scenarios where less overhead is desired. This scheme may not require a specific pilot sequence for channel estimation, and therefore may facilitate lower overhead than other modulation schemes.

Let $d_1$ be the data symbol desired to be transmitted. In this scheme, each symbol is represented as a two-dimensional symbol vector structured as $$s_1 = \begin{bmatrix} a \times d_1 \\ \frac{1}{b} \times \bar{d}_1 \end{bmatrix}$$

where a and b are the weights such that $\sqrt{ab}=|d_1|$ and $\bar{\cdot}$ is the conjugate of its argument.

By including the wireless channel, and assuming it is a narrow band channel, the received symbol can be expressed as $$\tilde{s}_1 = \begin{bmatrix} s_1 \\ s_2 \end{bmatrix} = \begin{bmatrix} h_1 \times a \times d_1 \\ h_2 \times \frac{1}{b} \times \bar{d}_1 \end{bmatrix}$$

where $h_1$ and $h_2$ are the channel coefficients. At the receiver, the symbol may be detected as follows $$\tilde{d}_1 = \frac{s_1}{\sqrt{s_1 s_2}} = \frac{h_1 a d_1}{\sqrt{\frac{a}{b}|d_1|^2 h_1 h_2}} = \frac{h_1}{\sqrt{h_1 h_2}} \times \frac{\sqrt{ab}}{\mp|d_1|} \times d_1 \stackrel{(a)}{=} \frac{\mp h_1}{\sqrt{h_1 h_2}} \times d_1$$

where (a) is due to the assumption that $\sqrt{ab}=|d_1|$. In order to handle the sign ambiguity due to the square root operation, one may use half of the constellation points. For example, it may use the first and fourth quadrant of the constellation place for $d_1$. In another embodiment, the corresponding constellation bit mapping for this operation may be indicated to the receiver. The bitmap or identical mapping for different constellation may be pre-defined or signaled to the receiver for demodulation. If it is assumed that $h_1 \cong h_2$ which may indicate the strong correlation or similar channel coefficients between adjacent symbols within the coherence bandwidth, coherence time, or coherence space or angle, or adjacent subcarriers within the coherence time, then $$\tilde{d}_1 = \frac{h_1}{\sqrt{h_1 h_2}} \times d_1 \cong d_1.$$

Figure 8A:
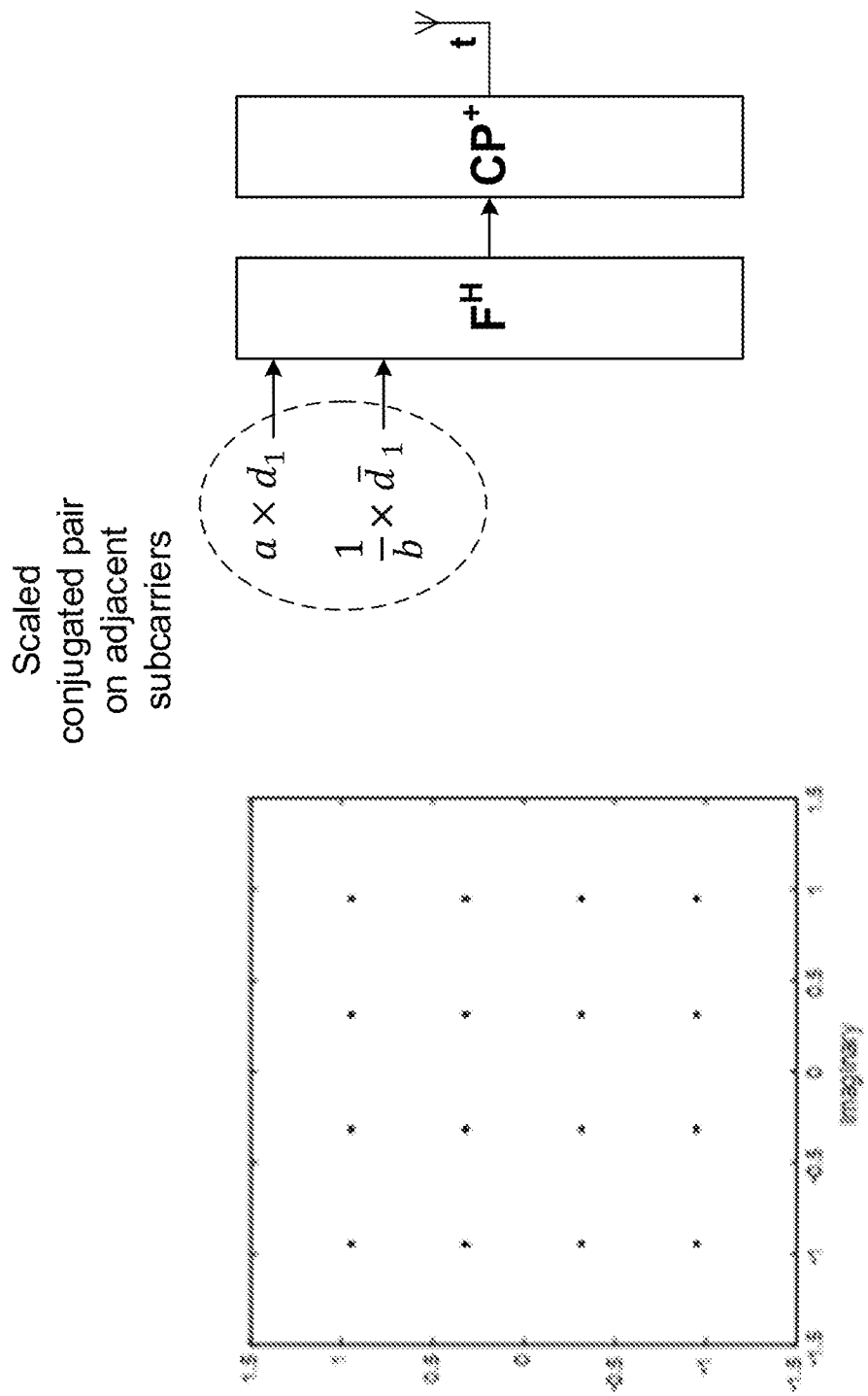
FIGS. 8A-8B depict exemplary block diagrams for one embodiment of two-dimensional scaled pair modulation for 16 QAM, with FIG. 8A depicting a transmitter side portion and FIG. 8B depicting a receiver side portion.
Figure 8B:
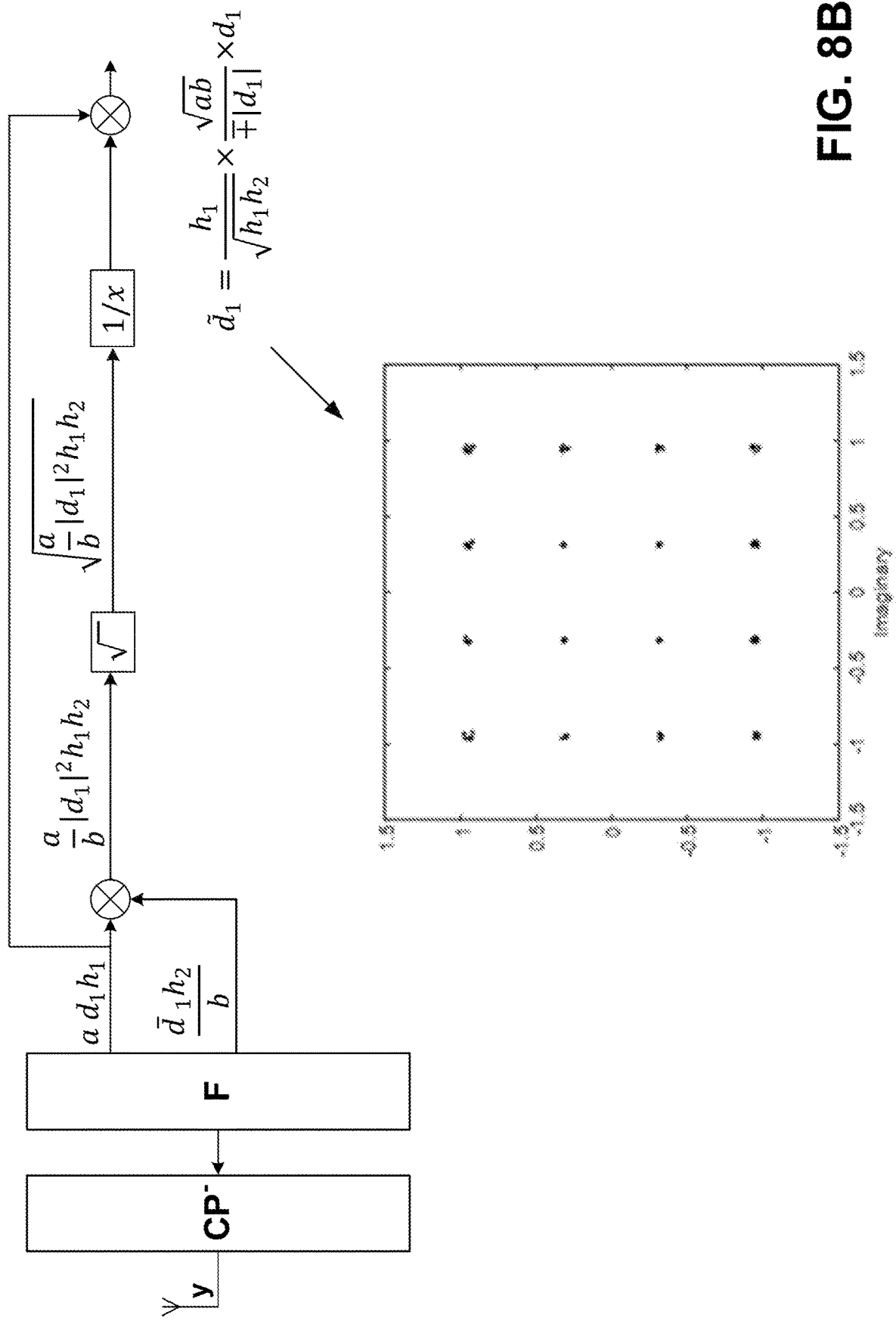

An exemplary illustration of two-dimensional scaled pair modulation for 16 QAM in an OFDM scenario is shown in FIG. 8. In this setup, $s_1$ and $s_2$ drive the adjacent subcarriers. Since the channels on the adjacent subcarriers are strongly correlated, the aforementioned operation may yield the demodulation of the 16 QAM symbols without estimating the channel. Note that this is just an example to illustrate how to apply two-dimensional scaled pair modulation to 16 QAM in the context of the OFDM scenario. It can be applied to any M-ary modulations, as known to one of ordinary skill in the art.

Embodiment 5: Multi Carrier Modulation. In some cases, methods for optimization for the highest possible SE within a given EE constraint are desired, such as for low power applications such as mMTC. In some cases, there are requirements for ultra-high reliable modulation schemes that do not sacrifice latency. Some embodiments disclosed herein address these requirements.

In a Multi-Band OFDM (MB-OFDM) Ultra-Wideband (UWB) system, some of the advanced techniques, including the dual carrier modulation (DCM) have been introduced to achieve high data rate and highly spectrally efficient transmissions. A feature of DCM is that the two QPSK modulated symbols may be mapped into two 16-QAM symbols that are transmitted over two different subcarriers of a OFDM system with a large frequency separation, e.g., each of the 16-QAM symbols are placed on a different tone with a subcarrier separation greater than the frequency coherence of the channel, which allows for exploiting the frequency diversity. DCM may also provide a benefit for the implementation of the RF radio by preventing the creation of destructive alias interference to adjacent sub-carriers during OFDM transmissions. DCM may also be used for constellation rearrangement in hybrid automatic request (H-ARQ) with chase combining.

Figure 9:
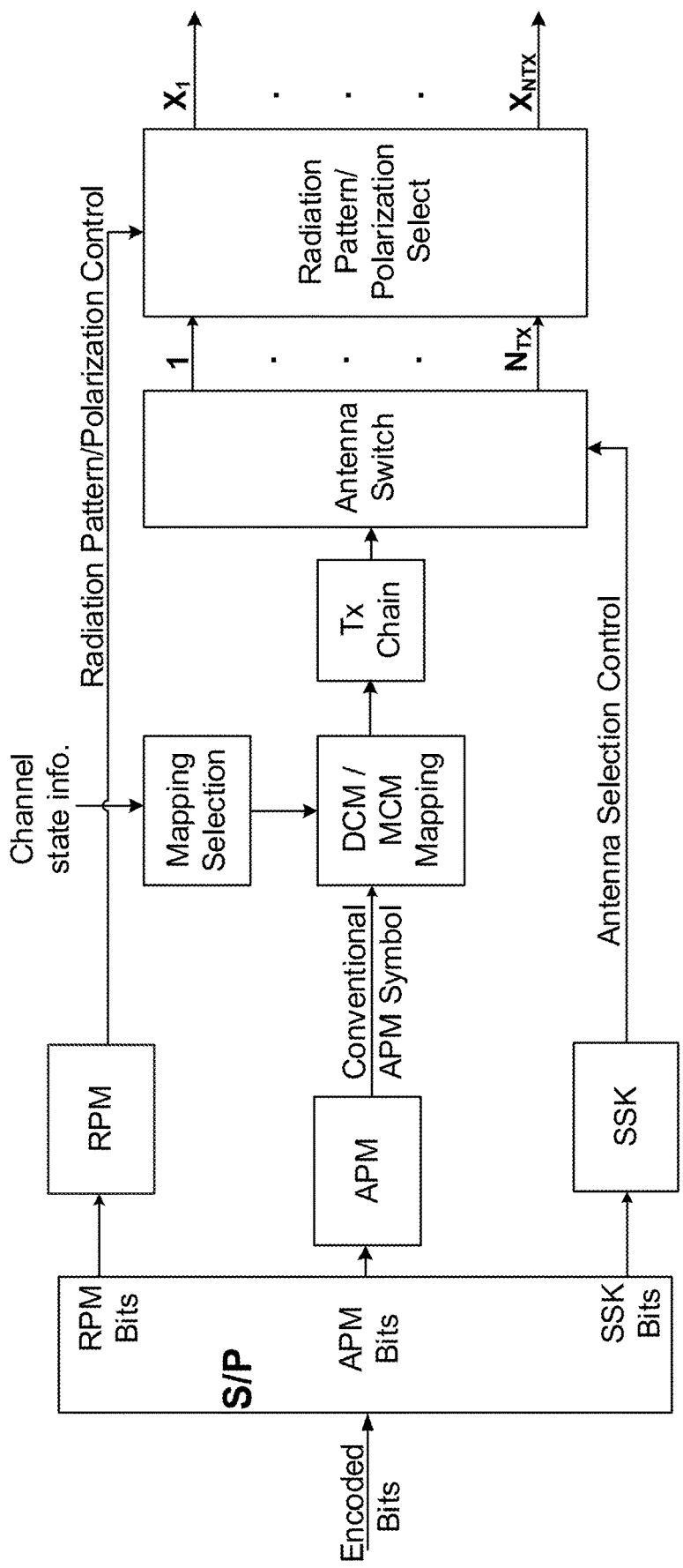
FIG. 9 is a functional block diagram for one embodiment of a transmitter with combined SM-MIMO, RPM, and DCM/MCM.

FIG. 9 depicts a diagram of an exemplary embodiment of a functional block diagram of a transmitter with DCM/MCM modulation.

Multi-dimensional Dual Carrier Modulation. In one embodiment, DCM may be extended from the frequency domain to other dimensions such as time, frequency and spatial domains, etc., which may be named as multi-dimensional DCM. This scheme may provide flexibility of scheduling and more opportunities for diversity gain which may improve system performance and spectral efficiency.

An illustrative exemplary implementation procedure for combining DCM/MCM with enhanced spatial modulation and transmit diversity is depicted in FIG. 9. The sub-carrier selections for the APM block may occur symmetrically about the DC carrier of the OFDM, or OFDM based, transmit procedure.

Figure 10:
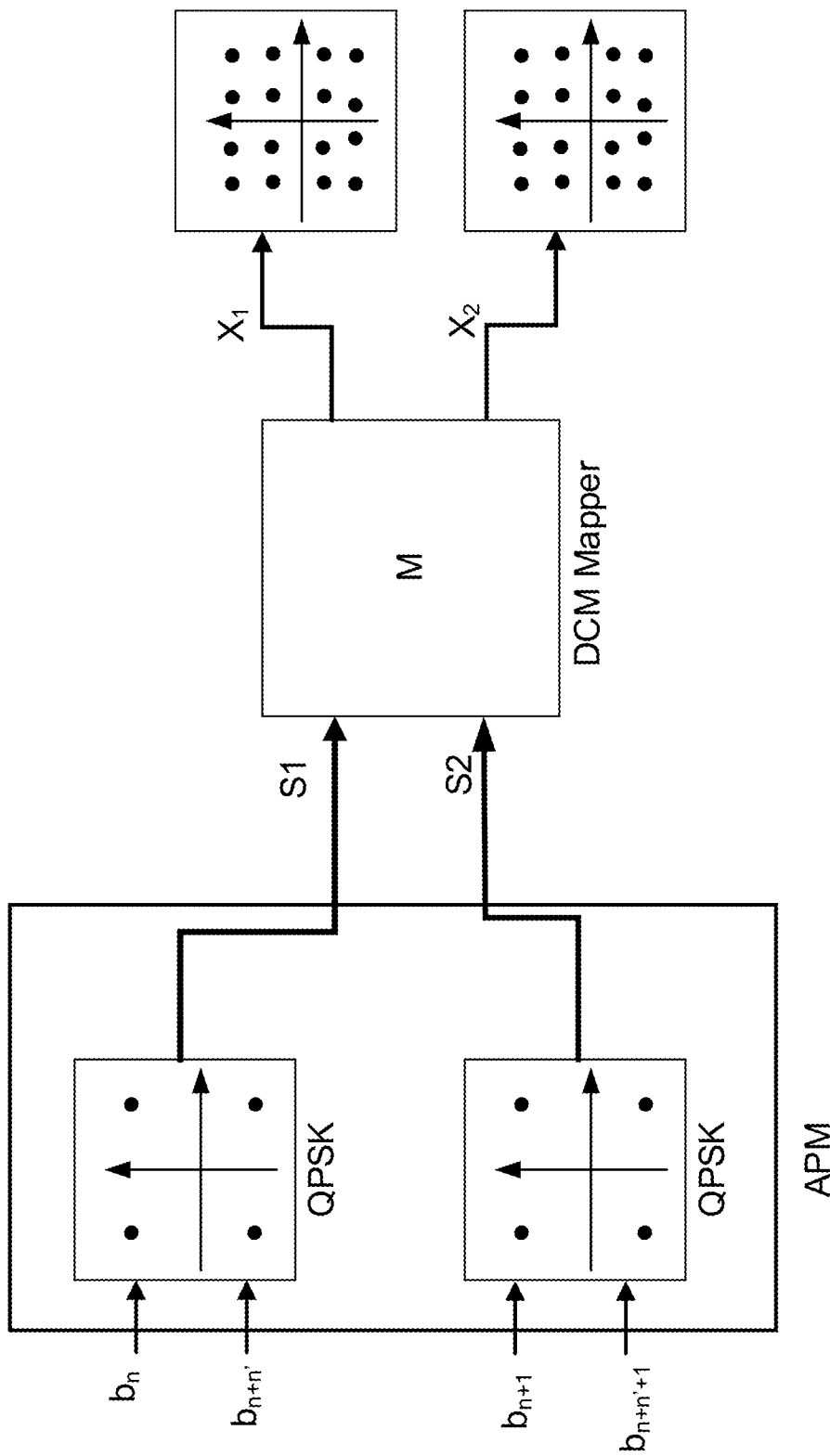
FIG. 10 is an exemplary block diagram for one embodiment of a transmitter procedure for DCM mapping.

As shown in FIG. 10, a bit sequence b may be grouped, and each group may have four bits represented as b(n), b(n+n'), b(n+1), b(n+n'+1). Here, the bit sequence is composed of bit 1 and −1. These four bits may be mapped to two QPSK symbols as represented by $$\text{Symbol}_1 = S_1 = (b_n + jb_{n'})$$

$$\text{Symbol}_2 = S_2 = (b_{n+1} + jb_{n+n'+1})$$

$S_1$ and $S_2$ are then applied to a DCM function M which produces two 16 QAM symbols constructed from the two QPSK symbols $S_1$, $S_2$, or 4 binary bits b(n), b(n+n'), b(n+1), b(n+n'+1). For example, the spatial modulation transmission on each antenna port may take place at the time instants n and n+1.

Multi-Carrier Modulation. In another embodiment, Multi-Carrier Modulation (MCM) may be utilized such that multiple symbols are mapped into multiple M-QAM such as 64-QAM or higher order symbols transmitted using a multiple of sub-carriers. For example, the generated MCM symbols may be allocated in a symmetric fashion on either side of the DC carrier in OFDM transmissions for easy scheduling or allocated with a pre-defined or configured resource pattern such as in a uniform fashion. These methods leverage the frequency diversity of the channel to improve the symbol transmission reliability and spectral efficiency. Since the reliability is improved in one transmission instance the EE may be also improved relative to other methods that may improve the reliability.

Figure 11:
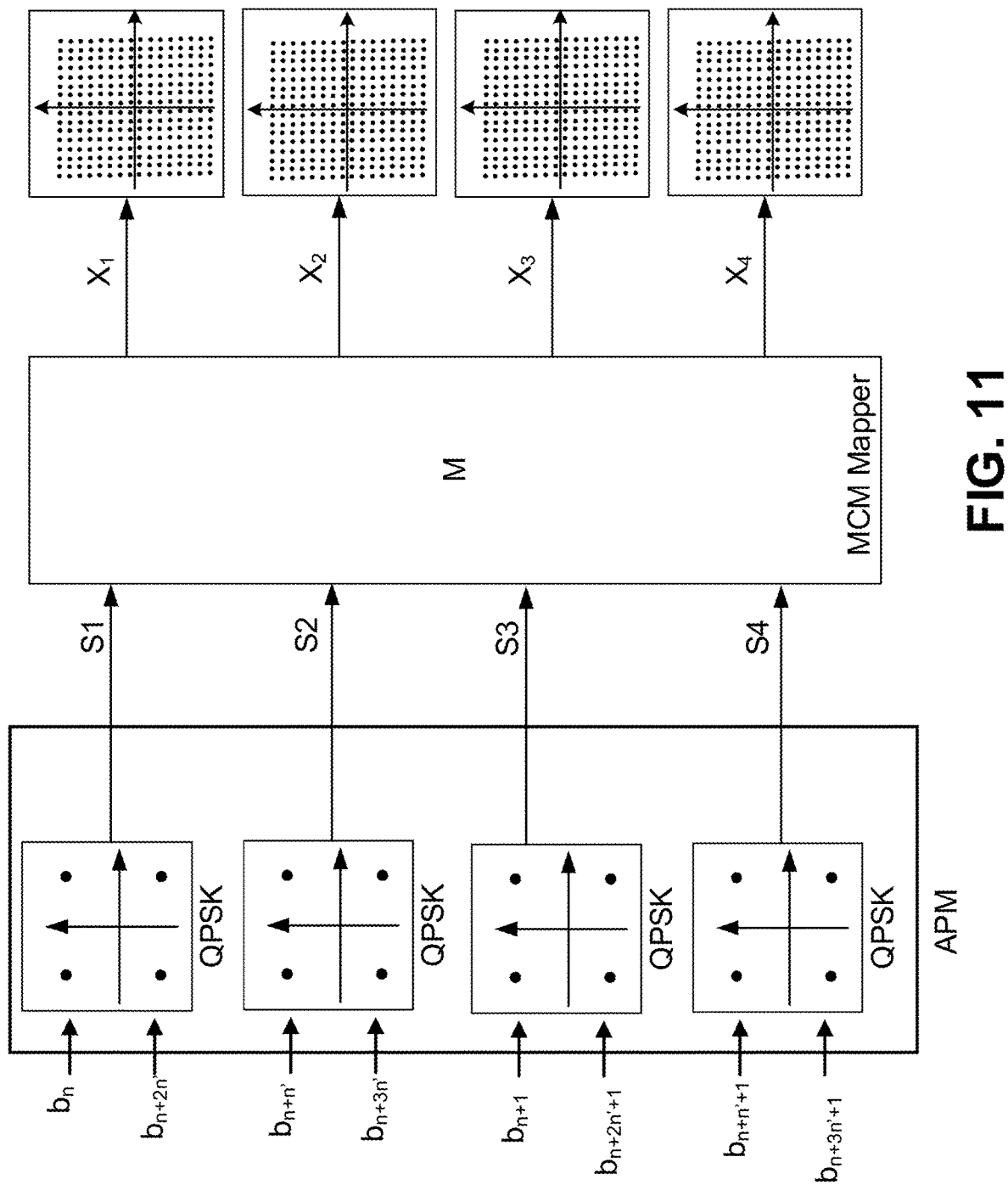
FIG. 11 is an exemplary block diagram for one embodiment of a transmitter procedure for MCM mapping

An illustrative exemplary implementation procedure for MCM is depicted in FIG. 11. A bit sequence b is grouped, and each group has 8 bits represented as b(n), b(n+1), b(n+n'), b(n+n'+1), b(n+2n'), b(n+2n'+1) b(n+3n'), b(n+3n'+1). Here, the bit sequence is composed of bit 1 and −1. These eight bits are mapped to four QPSK symbols as represented by the following, $$\text{Symbol}_1 = S_1 = (b_n + jb_{n+2n'})$$

$$\text{Symbol}_2 = S_2 = (b_{n+n'} + jb_{n+3n'})$$

$$\text{Symbol}_3 = S_3 = (b_{n+1} + jb_{n+2n'+1})$$

$$\text{Symbol}_4 = S_4 = (b_{n+n'+1} + jb_{n+3n'+1})$$

$S_1$, $S_2$, $S_3$, $S_4$ are then applied to a MCM function M which produces four 256 QAM symbols constructed from the four QPSK symbols $S_1$, $S_2$, $S_3$, $S_4$ or 8 bits b(n), b(n+1), b(n+n'), b(n+n'+1), b(n+2n'), b(n+2n'+1) b(n+3n'), b(n+3n'+1). Here, the selection of n' can be arbitrary. In general, the larger n', the more diversity gain could be achieved.

One example of the MCM function M may be $$M = \begin{bmatrix} 8 & 4 & 2 & 1 \\ 1 & -2 & 4 & -8 \\ -2 & -1 & 8 & 4 \\ 4 & -8 & -1 & 2 \end{bmatrix}.$$

This selection of M results in an orthogonal matrix. The outputs of this MCM function are $8S_1+4S_2+2S_3+S_4$, $S_1-2S_2+4S_3-8S_4$, $-2S_1-S_2+8S_3+4S_4$, and $4S_1-8S_2-S_3+2S_4$. Note that $S_1$, $S_2$, $S_3$, $S_4$ are QPSK symbols and have the values $\{-1, 1\}$ before power normalization. Hence, the above four outputs of the MCM function could be of values $\{-15, -13, -11, -9, -7, -5, -3, -1, 1, 3, 5, 7, 9, 11, 13, 15\}$ before power normalization. In other words, they are 256 QAM symbols. Due to the spreading, the QPSK symbols are substantially uniform, and the resulting 256 QAM symbols are also uniformly distributed. Comparing with the DCM function, more redundancy is introduced in the MCM function, as the diversity factor of MCM is 4. This increases the reliability of the transmission.

The M matrix does not need to be square matrix. It depends on the diversity factor. For example, if it is desired to reduce the diversity factor from 4 to 3, then any three rows of the above M matrix may be selected to generate three 256 QAM symbols from 4 QPSK symbols (or 8 BPSK).

In general, the dimension of matrix M may be determined by modulation order of the output symbols and the diversity factor. Suppose the matrix M is a p×q matrix. Then the diversity factor is p, where q is selected as $$\frac{\log_2 M_2}{\log_2 M_1},$$

wherein $M_1$ and $M_2$ are respectively the modulation orders of the first and the second plurality of constellation symbols. For example, in FIG. 11, p is 4, q is 4, $M_1$ is 4, and $M_2$ is 256.

Alternatively, the matrix M may be implemented in a different way such as rotation and component-level interleaver, or constellation rearrangement.

Multi-dimensional Multi-Carrier Modulation. In another embodiment, MCM may be combined with spatial modulation and transmit diversity. The sub-carrier selections for the APM block may occur symmetrically about the DC carrier of the OFDM, or OFDM based, transmit procedure. For example, the spatial modulation transmission on each antenna port may take place at the time instants n, n+1, n+2, and n+3.

The assignments of the DCM/MCM output modulated symbols, e.g., 16 QAM symbols $X_1$, $X_2$, or 256 QAM symbols $X_1$, $X_2$, $X_3$, $X_4$ mentioned above over sub-carriers (or resource elements or resource blocks, etc.) and/or spatial antennas and/or RPM (e.g., different polarization) may be performed in a way to optimize the frequency/spatial diversity. The assignment may be in a pre-defined pattern. For example, the separation of $X_i$ and $X_{i+1}$ may be at least n' subcarriers in frequency domain, or at least n' distance apart in spatial domain. The assignment may also be dynamic using channel related information such as the CSI of the subcarriers and/or spatial channels, and the assignment may vary in time.

Additionally, other constellation selections are possible, for example 4 BPSK symbols may be used for which M produces two 16 QAM symbols. In other words, the matrix M is a p×q matrix, where p is 2 and q is 4. Still other modulation combinations are also possible.

In some embodiment the selection of the sub-carriers for DCM/MCM may be indexed to the selected transmit antenna, or antenna port. This allows the optimization of the spatial diversity for each transmission instance of a symbol pair.

In an additional embodiment the sub-carrier selections for DCM/MCM may also be grouped to facilitate polarization diversity transmissions.

These aspects may be extended to high QAM constellations wherein the sub-carrier selections may extend to multiple symmetric pairs.

Joint FQAM and Multi-Carrier Modulation. FQAM has been introduced for information bearing, as in RWS-150039, "Vision and schedule for 5G radio technologies," Samsung, 3GPP RAN Workshop on 5G. September 2015. In one embodiment, the DCM/MCM modulation may be combined with the FQAM scheme to obtain additional diversity while maintaining information bearing characteristic of FQAM.

In other words, some information bits (say, n bits) could be used to select a subcarrier within a group of $2^n$ sub-carriers to transmit any symbol $X_i$ generated via the DCM/MCM modulation.

Here, DCM/MCM modulation may be interpreted as dual group modulation/multi-group modulation (DGM/MGM). The number of sub-carrier groups is equal to the diversity factor of the DGM/MGM. The sub-carrier groups' selection could be based on channel related information, such as CSI estimation. By doing so, the additional level of frequency diversity may be achieved as well as the diversity in the signal domain due to the DCM/MCM modulation.

Although the features and elements of the present invention are described in the preferred embodiments in particular combinations, each feature or element can be used alone without the other features and elements of the preferred embodiments or in various combinations with or without other features and elements of the present invention.

Although the solutions described herein consider 5G specific protocols, it is understood that the solutions described herein are not restricted to this scenario and are applicable to other wireless systems as well.

Additional embodiments. Various additional embodiments may include, but are not limited to, the following.

In one embodiment, there is a method comprising utilizing a reconfigurable antenna to vary at least one of a radiation pattern and a polarization mode to modulate additional information onto a conventional Spatial Modulation MIMO transmitted signal.

In one embodiment, there is a method comprising receiving as input a set of encoded bits. The method also comprises dividing the set of encoded bits into a plurality of groups. The method also comprises mapping the groups, comprising: mapping a first group to a signal based modulation format; and mapping each other group to a control signal for a configurable feature of a transmitter system. The method also comprises generating and modulating a base signal according to the mapping of the first group onto the modulation format. The method also comprises selecting at least one antenna of a plurality of configurable antennas and at least one configurable feature of the at least one antenna based on the control signals of the mappings of each other group. The method also comprises transmitting the modulated signal from the selected and configured at least one antenna. In some embodiments, the method further comprises wherein each of the plurality of configurable antennas is configurable to vary a radiation pattern. In some embodiments, the method further comprises wherein each of the plurality of configurable antennas is configurable to vary a polarization mode. In some embodiments, the method further comprises wherein each of the plurality of configurable antennas is configurable to vary at least one of a radiation pattern and a polarization mode. In some embodiments, the method further comprises wherein the control signal for antenna selection selects a single antenna of the plurality of configurable antennas. In some embodiments, the method further comprises wherein the control signal for antenna selection selects a subset of the plurality of configurable antennas. In some embodiments, the method further comprises wherein the set of encoded bits is divided into four groups, wherein the fourth group is mapped to a control signal indicating which of a plurality of frequency subcarriers will be used for the current channel use.

In one embodiment, there is a method comprising: receiving as input a set of encoded bits; dividing the set of encoded bits into at least three groups; mapping the first group to a signal based modulation format; mapping the second group to a control signal for antenna selection; mapping the third group to a control signal for controlling antenna configuration; generating a modulated RF signal based on the mapping of the first group; selecting at least one configurable antenna of a plurality of configurable antennas for transmission based on the mapping of the second group; configuring the at least one configurable antenna based on the mapping of the third group; and transmitting the modulated RF signal through the at least one configured antenna. In some embodiments, the method further comprises wherein each of the plurality of configurable antennas is configurable to vary a radiation pattern. In some embodiments, the method further comprises wherein each of the plurality of configurable antennas is configurable to vary a polarization mode. In some embodiments, the method further comprises wherein each of the plurality of configurable antennas is configurable to vary at least one of a radiation pattern and a polarization mode. In some embodiments, the method further comprises wherein the control signal for antenna selection selects a single antenna of the plurality of configurable antennas. In some embodiments, the method further comprises wherein the control signal for antenna selection selects a subset of the plurality of configurable antennas. In some embodiments, the method further comprises wherein the set of encoded bits is divided into four groups, wherein the fourth group is mapped to a control signal indicating which of a plurality of frequency subcarriers will be used for the current channel use. In some embodiments, the method further comprises wherein the set of encoded bits is divided into four groups, wherein the fourth group is mapped to a control signal indicating which of a plurality of time units will be used for the current channel use. In some embodiments, the method further comprises wherein the set of encoded bits is divided into five groups, wherein the fourth group is mapped to a control signal indicating which of a plurality of frequency subcarriers will be used for the current channel use, and the fifth group is mapped to a control signal indicating which of a plurality of time units will be used for the current channel use. In some embodiments, the method further comprises wherein a fourth group of bits is mapped to a control signal indicating a multi-carrier modulation (MCM) mapping selection. In some embodiments, the method further comprises wherein the selection of sub-carriers for MCM is indexed to at least one selected transmit antenna or antenna port. In some embodiments, the method further comprises wherein the selection of sub-carriers for MCM is grouped to facilitate polarization diversity transmissions. In some embodiments, the method further comprises wherein for high QAM constellations the selection of sub-carriers for MCM is extended to multiple symmetric pairs.

In one embodiment, there is a method of Enhanced Spatial Modulation with Radiation Pattern and/or Polarization Modulation, the method comprising: dividing a set of encoded bits into a plurality of groups, wherein: at least some bits are set into an Amplitude and/or Phase Modulation (APM) group; at least some bits are set into a Space Shift Keying (SSK) group; and at least some bits are set into a Radiation Pattern/Polarization Modulation (RPM) group. The method also comprises mapping each of the plurality of groups of bits, wherein: the APM group is mapped onto a signal based modulation format; the SSK group is mapped to a control signal indicating which of a plurality of antennas will be active for the current channel use; and the RPM group is mapped to a control signal which selects the radiation pattern and/or polarization mode used for the current channel use. The method also comprises modulating the conventional APM symbol. The method also comprises up converting the modulated APM symbol to the RF domain. The method also comprises sending the up converted modulated APM symbol through a Tx RF chain. The method also comprises transmitting the generated and modulated RF signal onto an active antenna selected based on the SSK group mapping, wherein the active antenna is configurable and configured into one of a plurality of modes based on the RPM group mapping. In some embodiments, the method further comprises a dual carrier modulation (DCM) of the conventional APM symbol. In some embodiments, the method further comprises wherein the DCM maps two QPSK modulated symbols into two 16-QAM symbols which will be transmitted over two different sub-carriers with a separation greater than the frequency coherence of the channel. In some embodiments, the method further comprises a multi-carrier modulation (MCM) of the conventional APM symbol. In some embodiments, the method further comprises wherein the MCM maps a plurality of modulated symbols into a plurality of 64-QAM or higher order symbols, which will be transmitted over a plurality of subcarriers. In some embodiments, the method further comprises wherein MCM maps a plurality of modulated symbols by a p×q matrix, such that the diversity factor is p and q is selected as $$\frac{\log_2 M_2}{\log_2 M_1},$$

wherein $M_1$ and $M_2$ are respectively the modulation orders of the first and the second plurality of constellation symbols. In some embodiments, the method further comprises a multi-carrier modulation (MCM) of at least one of the APM, SSK, or RPM mappings. In some embodiments, the method further comprises wherein the APM mapping undergoes MCM and the MCM output modulated symbols are assigned over subcarriers separated by at least n' subcarriers. In some embodiments, the method further comprises wherein the SSK mapping undergoes MCM and the MCM output modulated symbols are assigned over spatial antennas such that the output modulated symbols are at least n' distance apart in the spatial domain. In some embodiments, the method further comprises wherein MCM output modulated symbols are assigned as to optimize at least one of spatial and frequency diversity. In some embodiments, the method further comprises wherein MCM output modulated symbols are assigned in a predefined pattern. In some embodiments, the method further comprises wherein MCM output modulated symbols are assigned dynamically using channel related information. In some embodiments, the method further comprise wherein the MCM further comprises multi-group modulation (MGM).

In one embodiment, there is a method comprising enhancing Generalized Spatial Modulation (GSM) with Frequency Amplitude and/or Phase Modulation (FAPM) as well as transmit diversity schemes such as SFBC and/or STBC to achieve diversity gain in space, time, and frequency domains simultaneously.

In one embodiment, there is a method comprising: receiving as input a set of encoded bits; dividing the set of encoded bits into at least four groups; mapping the first group to a signal based modulation format; mapping the second group to a control signal for antenna selection; mapping the third group to a control signal for a combination of frequency subcarriers limited by a diversity order factor; generating a modulated RF signal based on the mapping of the first group; selecting at least one configurable antenna of a plurality of configurable antennas for transmission based on the mapping of the second group; configuring the at least one configurable antenna based on the mapping of the third group; and transmitting the modulated RF signal through the at least one configured antenna. In some embodiments, the method further comprises wherein conventional APM symbols are first mapped to the selected frequency subcarriers via an SFBC encoder, and are then sent to an STBC encoder for a second level of diversity encoding using the time dimension. In some embodiments, the method further comprises wherein the outputs from the STBC encoder are then modulated, up converted to the RF domain, and passed through two Tx RF chains.

In one embodiment, there is a method of demodulation for Enhanced Spatial Modulation with Radiation Pattern and Polarization Modulation, comprising: receiving at a receiver a signal carrying a unique spatial signature based on a selected antenna as well as a radiation pattern used at a transmitter; demodulating the signal; and detecting bits using channel estimation based on receiver structures. In some embodiments, the method further comprises wherein the received signal is demodulated using at least one of a Maximum Likelihood, Minimum Mean Squared Error, or Zero Forcing approach. In some embodiments, the method further comprises wherein a channel decoder is optimized for each mode of reception. In some embodiments, the method further comprises wherein a channel decoder soft mapping procedure is different for SSK, APM, and RPM reception, respectively. In some embodiments, the method further comprises wherein the receiver provides log likelihood estimates that are unique for each reception mode. In some embodiments, the method further comprises wherein for massive multi-user MIMO the receiver is a simple single tap matched filter for each channel.

In one embodiment, there is a method of demodulation, comprising: receiving at a receiver a signal carrying a unique spatial signature based on a selected antenna as well as a radiation pattern used at a transmitter; demodulating the received signal; and detecting bits using channel estimation based on receiver structures. In some embodiments, the method further comprises wherein the received signal is demodulated using at least one of a Maximum Likelihood, Minimum Mean Squared Error, or Zero Forcing approach.

In one embodiment, there is a method comprising enabling non-coherent communications for any M-ary modulations that bear information bits by phase and/or amplitude.

In one embodiment, there is a method comprising two-dimensional scaled pair modulation to permit demodulation without estimating a channel, comprising transmitting a scaled conjugate pair on adjacent subcarriers or other resources. In some embodiments, the method further comprises structuring a data symbol $d_1$ as a two-dimensional symbol vector structured as $$s_1 = \begin{bmatrix} a \times d_1 \\ \frac{1}{b} \times \bar{d}_1 \end{bmatrix}$$

where a and b are the weights such that $\sqrt{ab}=|d_1|$ and $\bar{\phantom{x}}$ is the conjugate of its argument. In another embodiment, when two-dimensional scaled pair modulation is employed, half of the constellation points (e.g., first and fourth quadrant of the constellation place) for $d_1$ may be used and the corresponding constellation mapping information (e.g., bitmap or identical mapping for different constellation) may be pre-defined or indicated to the receiver.

In one embodiment, there is a method of Multi-dimensional Multi-Carrier Modulation (MCM), comprising: receiving a plurality of sets of information bits and responsively generating a respective first plurality of constellation symbols selected from a first constellation symbol set. The method also comprises generating a second plurality of constellation symbols from the first plurality of constellation symbols using an MCM mapping function, wherein the second plurality of constellation symbols are selected from a constellation symbol set having a higher order than the first constellation symbol set (e.g., MCM maps from QPSK symbol to 256 QAM symbol). The method may also comprise either/or: transmitting the second plurality of constellation symbols using resources in the spatial modulation domain and/or RPM domain (to increase spectral efficiency); and transmitting the second plurality of symbols using resources in a time and/or spatial domain to achieve diversity gain, wherein the resource assignment may be in a pre-defined pattern or dynamic based on channel related information. The method may comprise wherein the MCM mapping function maps the first plurality of constellation symbols to the second plurality of constellation symbols by a p×q matrix, such that the diversity factor is p, while q is selected as $$\frac{\log_2 M_2}{\log_2 M_1},$$

wherein $M_1$ and $M_2$ are respectively the modulation orders of the first and the second plurality of constellation symbols. The method may comprise wherein the matrix dimension is 2×1, and the first matrix component is a first plurality of constellation symbols scaled by a first scaling factor, and the second matrix component is a complex conjugation of the first plurality of constellation symbols scaled by a second scaling factor. The method may comprise wherein the selection of the first and the second scaling factors, such that the square root of the division of the first scaling factor by the second scaling factor is the absolute value of the first plurality of constellation symbols, is for non-coherent communication. The method may comprise wherein a dimensional diversity assignment of the second plurality of constellation symbols is selected for improved diversity gain. The method may comprise wherein the dimensional diversity assignment is in a predefined pattern. The method may comprise wherein the dimensional diversity assignment is dynamic using channel related information.

In one embodiment, there is a method of multi-dimensional modulation, comprising: enhanced spatial modulation with antenna radiation pattern and/or polarization modulation (RPM) to modulate additional information; Multi-Carrier Modulation (MCM); transmitting the second plurality of constellation symbols using resources in the frequency and/or spatial and/or RPM domain to increase spectral efficiency, and/or transmitting the second plurality of symbols using resources in a frequency and/or time and/or spatial domain to achieve diversity gain, wherein the resource assignment may be in a pre-defined pattern or dynamic based on channel related information. The MCM may comprise: receiving a plurality of sets of information bits and responsively generating a respective first plurality of constellation symbols selected from a first constellation symbol set; and generating a second plurality of constellation symbols from the first plurality of constellation symbols using an MCM mapping function, wherein the second plurality of constellation symbols are selected from a constellation symbol set having a higher order than the first constellation symbol set.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:
1. A method, comprising:
    receiving as input a set of encoded bits;
    dividing the set of encoded bits into a plurality of groups;
    mapping the plurality of groups, comprising:
        mapping a first group to a signal space based modulation format;
        mapping a second group to a radiation pattern/polarization modulation (RPM) of a configurable antenna; and
        mapping each other group to a control signal for a distinct configurable feature of a transmitter system;
        generating a first plurality of constellation symbols selected from a first constellation symbol set according to the mapping of the first group onto the signal space based modulation format generating a second plurality of constellation symbols from the first plurality of constellation symbols using a multi-carrier modulation (MCM) mapping function, wherein the second plurality of constellation symbols are selected from a second constellation symbol set having a higher order than the first constellation symbol set configuring the RPM of at least one of a plurality of configurable antennas of the transmitter system into one of a plurality of modes according to the mapping of the second group;

configuring at least one additional configurable feature of at least one of the plurality of configurable antennas of the transmitter system according to the control signal of the mapping of at least one of the other groups; and transmitting a modulated signal from the configured at least one configurable antenna.

2. The method of claim 1, further comprising selecting at least one of the plurality of configurable antennas of the transmitter system based on the mapping of a third group, wherein the third group is mapped to a control signal for antenna selection.

3. The method of claim 1, wherein one of the plurality of groups of encoded bits is mapped to a control signal indicating a set of a plurality of frequency subcarriers to be utilized.

4. The method of claim 1, wherein one of the plurality of groups of encoded bits is mapped to a control signal indicating a set of a plurality of time units to be utilized.

5. The method of claim 1, wherein a dimensional diversity assignment of one of the plurality of groups of encoded bits is selected to increase spectral efficiency.

6. The method of claim 1, wherein a selection of subcarriers for MCM is grouped to facilitate polarization diversity transmissions.

7. The method of claim 1, wherein for high QAM (Quadrature Amplitude Modulation) constellations, a selection of sub-carriers for MCM is extended to multiple symmetric pairs.

8. The method of claim 1, wherein a dimensional diversity assignment of the second plurality of constellation symbols is selected for improved diversity gain.

9. The method of claim 8, wherein the dimensional diversity assignment is in a predefined pattern.

10. The method of claim 8, wherein the dimensional diversity assignment is dynamic using channel related information.

11. The method of claim 1, wherein the MCM mapping function maps the first plurality of constellation symbols to the second plurality of constellation symbols by a p×q matrix, such that a diversity factor is p, while q is selected as $$\frac{\log_2 M_2}{\log_2 M_1},$$

wherein $M_1$ and $M_2$ are respectively modulation orders of the first and the second plurality of constellation symbols.

12. The method of claim 11, wherein a dimension of the matrix is 2×1, and the a first matrix component is the first plurality of constellation symbols scaled by a first scaling factor, and a second matrix component is a complex conjugation of the first plurality of constellation symbols scaled by a second scaling factor.

13. The method of claim 12, wherein a selection of the first and the second scaling factors, such that the square root of the division of the first scaling factor by the second scaling factor is the absolute value of the first plurality of constellation symbols, is for non-coherent communication.

14. A system comprising a processor and a non-transitory storage medium storing instructions operative, when executed on the processor, to perform functions including:

receiving as input a set of encoded bits;

dividing the set of encoded bits into a plurality of groups;

mapping the plurality of groups, comprising:
mapping a first group to a signal space based modulation format;
mapping a second group to a radiation pattern/polarization modulation (RPM) of a configurable antenna; and
mapping each other group to a control signal for a distinct configurable feature of a transmitter system;

generating a first plurality of constellation symbols selected from a first constellation symbol set according to the mapping of the first group onto the signal space based modulation format;

generating a second plurality of constellation symbols from the first plurality of constellation symbols using a multi-carrier modulation (MCM) mapping function, wherein the second plurality of constellation symbols are selected from a second constellation symbol set having a higher order than the first constellation symbol set;

configuring the RPM of at least one of a plurality of configurable antennas of the transmitter system into one of a plurality of modes according to the mapping of the second group;

configuring at least one additional configurable feature of at least one of the plurality of configurable antennas of the transmitter system according to the control signal of the mapping of at least one of the other groups; and transmitting a modulated signal from the configured at least one configurable antenna.

15. The system of claim 14, wherein a dimensional diversity assignment of the second plurality of constellation symbols is selected for improved diversity gain.

16. The system of claim 15, wherein the dimensional diversity assignment is in a predefined pattern.

17. The system of claim 15, wherein the dimensional diversity assignment is dynamic using channel related information.

18. The system of claim 14, wherein the MCM mapping function maps the first plurality of constellation symbols to the second plurality of constellation symbols by a p×q matrix, such that a diversity factor is p, while q is selected as $$\frac{\log_2 M_2}{\log_2 M_1},$$

wherein $M_1$ and $M_2$ are respectively modulation orders of the first and the second plurality of constellation symbols.

19. The system of claim 18, wherein a dimension of the matrix is 2×1, and a first matrix component is the first plurality of constellation symbols scaled by a first scaling factor, and a second matrix component is a complex conjugation of the first plurality of constellation symbols scaled by a second scaling factor.

20. The system of claim 19, wherein a selection of the first and the second scaling factors, such that the square root of the division of the first scaling factor by the second scaling factor is the absolute value of the first plurality of constellation symbols, is for non-coherent communication.

* * * * *